United States Patent
Bybell et al.

(10) Patent No.: US 9,330,023 B2
(45) Date of Patent: *May 3, 2016

(54) MANAGING TRANSLATIONS ACROSS MULTIPLE CONTEXTS USING A TLB WITH ENTRIES DIRECTED TO MULTIPLE PRIVILEGE LEVELS AND TO MULTIPLE TYPES OF ADDRESS SPACES

(71) Applicant: INTERNATIONAL BUSINESS MACHINES CORPORATION, Armonk, NY (US)

(72) Inventors: Anthony J. Bybell, Cedar Park, TX (US); Bradly G. Frey, Austin, TX (US); Michael K. Gschwind, Chappaqua, NY (US); Benjamin Herrenschmidt, Narrabundah (AU); Paul Mackerras, Weston (AU)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 2 days.

This patent is subject to a terminal disclaimer.

(21) Appl. No.: 14/297,326

(22) Filed: Jun. 5, 2014

(65) Prior Publication Data

US 2015/0301939 A1    Oct. 22, 2015

Related U.S. Application Data

(63) Continuation of application No. 14/255,457, filed on Apr. 17, 2014.

(51) Int. Cl.
*G06F 12/10* (2006.01)
*G06F 12/14* (2006.01)

(52) U.S. Cl.
CPC .......... *G06F 12/1045* (2013.01); *G06F 12/109* (2013.01); *G06F 12/1027* (2013.01);

(Continued)

(58) Field of Classification Search
CPC .......... G06F 12/0292; G06F 2212/152; G06F 2212/68; G06F 2212/251
See application file for complete search history.

(56) References Cited

U.S. PATENT DOCUMENTS 5,754,818 A    5/1998 Mohamed
6,728,858 B2   4/2004 Willis et al.
(Continued)

FOREIGN PATENT DOCUMENTS

EP    0797149 B1    10/2001
WO    0197043 A1    12/2001

OTHER PUBLICATIONS

"The IBM Powerpc Embedded Environment", Version 1.0, June 1998, Copyright International Business Machines Corporation, 236 Pages.

(Continued)

*Primary Examiner* — John Lane
(74) *Attorney, Agent, or Firm* — Steven L. Bennett; Amy J. Pattillo

(57) ABSTRACT

For a current context in control of a processor requesting access to a particular address, a translation lookaside buffer (TLB) controller specifies a virtual address with a logical partition identifier value indicating a privilege setting of the current context, a process identifier value indicating whether the address is within shared address space, and an effective address comprising at least a portion of the particular address. In response to the virtual address not matching at least one entry within a TLB comprising at least one entry stored for at least one previous translation of at least one previous address, the TLB controller translates the virtual address into a real page number using at least one page table and adding a new entry to the TLB with the virtual address and the real page number, wherein each at least one entry within the TLB identifies a separate privilege setting from among a plurality of privilege settings and a separate indicator of whether the address is within the shared address space.

8 Claims, 11 Drawing Sheets

(52) U.S. Cl.
CPC ...... *G06F12/145* (2013.01); *G06F 2212/1052* (2013.01); *G06F 2212/151* (2013.01); *G06F 2212/152* (2013.01); *G06F 2212/251* (2013.01); *G06F 2212/50* (2013.01); *G06F 2212/651* (2013.01); *G06F 2212/656* (2013.01); *G06F 2212/657* (2013.01); *G06F 2212/684* (2013.01)

(56) References Cited

U.S. PATENT DOCUMENTS

| | | | |
|---|---|---|---|
| 7,165,164 | B2 | 1/2007 | Willis et al. |
| 7,194,597 | B2 | 3/2007 | Willis et al. |
| 7,386,669 | B2 | 6/2008 | Dombrowski et al. |
| 8,296,547 | B2 | 10/2012 | Heil et al. |
| 2005/0027960 | A1 | 2/2005 | Dement et al. |
| 2005/0172099 | A1 | 8/2005 | Lowe |
| 2006/0026384 | A1 | 2/2006 | Brandt et al. |
| 2008/0168461 | A1 | 7/2008 | Arndt et al. |
| 2008/0222397 | A1* | 9/2008 | Wilkerson ............ G06F 12/1483 712/220 |
| 2010/0125709 | A1 | 5/2010 | Hall et al. |
| 2011/0138149 | A1 | 6/2011 | Karlsson et al. |
| 2013/0024648 | A1 | 1/2013 | Chen et al. |
| 2013/0036291 | A1 | 2/2013 | Savagaonkar et al. |
| 2013/0067195 | A1 | 3/2013 | Sundrani et al. |

OTHER PUBLICATIONS

Arpaci-Dussea, "Paging: Faster Translations (TLBS)", 17 Pages, Including Page 8, Accessed Via the Internet From http://pages.cs.wisc.edu/~remzi/OSTEP/vm-tlbs.pdf as of December 12, 2014.

"Book E: Enhanced Powerpc Architecture", Version 1.0, May 7, 2002, Copyright International Business Machines Corproation, 452 Pages.

"Powerpc Operating Environment Architecture," Version 2.02, Copyright International Business Machines Corporation, 1994, 135 pages.

U.S. Appl. No. 14/255,367, filed Apr. 17, 2014, "Managing Translations of a Same Address Across Multiple Contexts Using a Same Entry in a Translation Lookaside Buffer", In re Bybell, 68 pages.

U.S. Appl. No. 14/255,457, filed Apr. 17, 2014, "Managing Translations Across Multiple Contexts Using a TLB with Entries Directed to Multiple Privilege Levels and to Multiple Types of Address Spaces", In re Bybell, 69 pages.

U.S. Appl. No. 14/297,605, filed Jun. 5, 2014, "Managing Translation of a Same Address Across Multiple Contexts Using a Same Entry in a Translation Lookaside Buffer", In re Bybell, 51 pages.

Non-Final Office Action, mailing date Sep. 25, 2015, U.S. Appl. No. 14/255,367, filed Apr. 17, 2014, In re Bybell, 19 pages.

Non-Final Office Action, mailing date Sep. 25, 2015, U.S. Appl. No. 14/297,605, filed Jun. 5, 2014, In re Bybell, 18 pages.

Non-Final Office Action, mailing date Apr. 17, 2014, U.S. Appl. No. 14/255,487, filed Apr. 17, 2014, In re Bybell, 24 pages.

Notice of Allowance, mailing date Jan. 15, 2016, U.S. Appl. No. 14/297,605, filed Jun. 5, 2014, In re Bybell, 14 pages.

Notice of Allowance, mailing date Jan. 21, 2016, U.S. Appl. No. 14/255,457, filed Apr. 17, 2014, In re Bybell, 14 pages.

* cited by examiner

MANAGING TRANSLATIONS ACROSS MULTIPLE CONTEXTS USING A TLB WITH ENTRIES DIRECTED TO MULTIPLE PRIVILEGE LEVELS AND TO MULTIPLE TYPES OF ADDRESS SPACES

CROSS REFERENCE TO RELATED APPLICATIONS

This application is a continuation of commonly assigned U.S. patent application Ser. No. 14/255,457, filed Apr. 17, 2014, which is hereby incorporated herein by reference.

BACKGROUND

1. Technical Field

This invention relates in general to managing translations using a translation lookaside buffer (TLB) and more particularly to managing translations across multiple contexts using a TLB including entries directed to multiple privilege levels and to multiple types of address spaces.

2. Description of the Related Art

Modern computer systems typically utilize a virtual memory system to address very large amounts of memory in one or more virtual address spaces, even though the main memory of the system populates a much smaller portion of physical memory address space. To map a virtual address to an address within the virtual address space to a physical memory address space, an operating system (OS) maps the virtual address space for each process to the actual physical address space for the system. The OS may maintain page tables to use for mapping a virtual address to a physical address.

Some virtual memory systems implement a specialized cache to store the last translation of a virtual address to physical address accessed from a page table. For example, a translation lookaside buffer (TLB), within a small section of memory in a processor pipeline, easily accessible to the processor, caches part of the system's virtual address to physical address translation. By storing recently mapped virtual address to physical address translations in a TLB, upon a next request for the same virtual address, a processor can quickly access a translation of the virtual address into a physical address from a previously stored entry in the TLB. If a translation for a particular virtual address is not present in the TLB, a "translation miss" occurs and the address translation is resolved from page tables.

Many computer systems implement a virtualization layer, such as a hypervisor, which manages one or more logical partitions (LPARs) on a server system, each LPAR functioning as self-contained platforms and each LPAR running its own instance of an operating system and other software. In one example, the operating system run by an LPAR is referred to as a guest operating system (OS) and the software run by an LPAR is referred to as guest software. The virtualization layer manages control over events and hardware resources on the underlying platform to interface between LPARs and the resources for protection from and between guest software running on different LPARs.

Within a system that supports multiple processes, operating on multiple LPARs, context switches may occur when a multi-tasking guest OS on an LPAR stops running one process and begins running another. Similarly, in a system that supports multiple LPARs, context switches occur when a processor shifts a control level of a hypervisor on or off.

BRIEF SUMMARY

In a system supporting context switches between multiple contexts, if a TLB is not flushed for each context switch, the TLB may include entries added to the TLB from virtual address look ups for contexts operating under different privilege levels and directed by different processes to both shared and not shared address spaces in one or more LPARs. Therefore, in view of the foregoing, there is a need for a method, system, and computer program product for managing translations across multiple contexts using a TLB including entries directed to multiple privilege levels and to multiple types of address spaces.

In one embodiment, a method for managing translations is directed to, for a current context in control of a processor requesting access to a particular address, specifying a virtual address with a logical partition identifier value indicating a privilege setting of the current context, a process identifier value indicating whether the address is within shared address space, and an effective address comprising at least a portion of the particular address. The method is directed, in response to the virtual address not matching at least one entry within a translation lookaside buffer comprising at least one entry stored for at least one previous translation of at least one previous address, to translating the virtual address into a real page number using at least one page table and adding a new entry to the translation lookaside buffer with the virtual address and the real page number, wherein each at least one entry within the translation lookaside buffer identifies a separate privilege setting from among a plurality of privilege settings and a separate indicator of whether the address is within the shared address space.

BRIEF DESCRIPTION OF THE SEVERAL VIEWS OF THE DRAWINGS

The novel features believed characteristic of one or more embodiments of the invention are set forth in the appended claims. The one or more embodiments of the invention itself however, will best be understood by reference to the following detailed description of an illustrative embodiment when read in conjunction with the accompanying drawings, wherein:

DETAILED DESCRIPTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

In addition, in the following description, for purposes of explanation, numerous systems are described. It is important to note, and it will be apparent to one skilled in the art, that the present invention may execute in a variety of systems, including a variety of computer systems and electronic devices operating any number of different types of operating systems.

Figure 1:
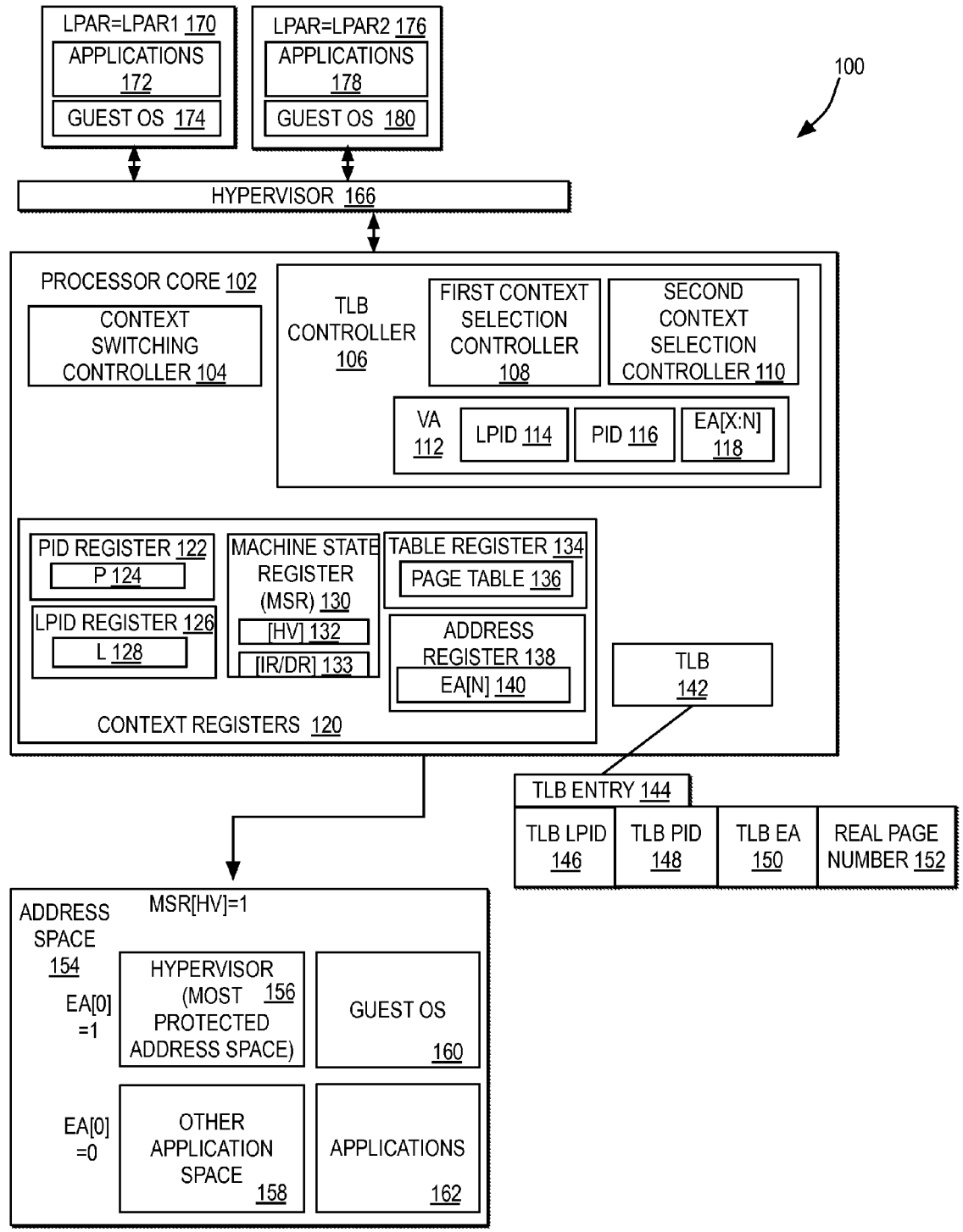
FIG. 1 is a block diagram illustrating one example of a TLB controller in a computer system for managing translation of a same address across multiple contexts using a same entry in a TLB and for managing TLB entries available to different privilege levels within a same TLB.

With reference now to the figures, and in particular, with reference now to FIG. 1, a block diagram illustrates one example of a TLB controller in a computer system for managing translation of a same address across multiple contexts using a same entry in a TLB and for managing TLB entries available to different privilege levels within a same TLB.

In one example, a computer system 100 implements a virtualization layer, such as a hypervisor 166, which manages one or more logical partitions (LPARs) on computer system 100, such as LPAR 170 and LPAR 176. Logical partitioning may refer to the capability to subdivide a single system into multiple LPARs, where each LPAR functions as a self-contained platform and each LPAR runs its own instance of an operating system and other software. In one example, LPAR 170 runs one or more applications, illustrated as applications 172, atop a guest operating system (OS) 174, and LPAR 176 runs one or more applications, illustrated as applications 178, atop a guest OS 180. In one example, processes performed by applications and the guest OS on each LPAR may perform as if they are running on a dedicated server system, rather than on one of multiple LPARs hosted by computer system 100. The processes running on each LPAR may expect to control events and have access to virtualized hardware resources, including memory resources allocated from an address space 154. In one example, hypervisor creates LPAR 170 and LPAR 176 by assigning portions of the total system virtual and physical resources and virtualizations of physical resources, including, but not limited to, processor-element execution time, real memory, and I/O devices, to each partition. Hypervisor 166 controls events and hardware resources on the underlying platform of processor core 102 to interface between LPAR 170 and LPAR 172 and processor core 102, to manage which resources are accessed by each LPAR and to manage access to resources by processes running on different LPARs. The hypervisor, with hardware assistance, may ensure that the operating system and applications in one LPAR have no knowledge of, or access to, the resources of another LPAR, unless specifically granted by the hypervisor, such as through the use of shared memory resources.

Within computer system 100, events may occur that shift which LPAR, and which processes within an LPAR, are in control of threads of processor core 102, where these shifts are referred to as a context switch. A context may represent one or more of an application, an operating system, or a hypervisor, or a hypervisor application, sending a request to processor core 102 that requires a memory access, while operating in one or more privileged modes. A context switch may occur, for example, when guest OS 174 stops running one application from among applications 172 and begins running another application within applications 172 or when guest OS 174 stops running an application and runs a process of the operating system. In another example, a context switch may occur when hypervisor 166 switches control of processor core 102 from LPAR 170 to LPAR 176. In another example, a context switch may occur during a mode switch that occurs when a machine state for processor core 102 is shifted to set processor core 102 to operate in a hypervisor mode, which is a highest privilege mode that allows access to all of address space 154, or not to operate in a hypervisor mode, in a less privileged mode that allows access to limited portions of address space 154. In additional or alternate embodiments, other shifts between the process requesting control, the partition requesting controlling, and the privilege mode of the processor may represent context switches within processor core 102.

Context switches in a computer system that implements a virtualized environment may cause additional overhead in processor core 102 for multiple reasons. In one example, for each context switch, one or more registers within processor core 102, including context registers 120, have to be reset, which may include buffering values for use when the same context is next reloaded, and may include loading new values to identify a current context. Hypervisor 166 may send instructions to processor core 102 for each context switch and processor core 102 may include a context switching controller 104, implemented in hardware, software, or a combination of hardware and software, for managing and minimizing the overhead incurred by context switching within processor core 102. In one example, context switching controller 104 may determine, upon a context switch, whether to flush one or more entries within TLB 142, if entries within TLB 142 are not marked to identify the process that requested the entry, or whether entries in TLB 142 are marked in a manner to allow for entries to remain within TLB 142 upon a context switch. In another example, context switching controller 104 may determine whether other data loaded for one context needs to be flushed upon a context switch.

In the example illustrated, address space 154, represents the available memory space managed by a memory management unit of processor core 102, which may be allocated by hypervisor 166 or other memory management unit. In one example, a portion of address space 154 may be initially allocated as a partition for hypervisor 166, where hypervisor 166 and hypervisor applications operating under hypervisor 166, function within the hypervisor partition. For example, address space 154 may include address space allocated for a hypervisor partition that may include a hypervisor space 156 and other application space 158. In one example, all or portions of hypervisor space 156 and other application space 158 may only be accessible when the processor is operating in a highest privilege mode, which may also be referred to as a hypervisor mode, and other application space 158 may refer to the address space allocated to the applications running below the hypervisor. In another example, other application space 158 may be space shared by multiple applications independent of the privilege mode setting.

In addition, in one example, hypervisor 166 manages allocation of separate partitioned spaces within address space 154 to each of LPAR 170 and LPAR 176. Within the partitioned spaces allocated to LPAR 170 and LPAR 176 within address space 154, the address space may be further allocated between a guest OS space 160 and an applications space 162. In one example, all or portions of guest OS space 160 allocated to a particular partition may be accessible by the multiple processes running within the particular partition. In one example, all or portions of guest OS space 160 may also be referred to as the address space allocated to the kernel. In one example, all or portions of applications space 162 allocated to a particular portion are only accessible by a particular process running within the particular partition. In one example, while hypervisor space 156 and other application space 158 may only be accessed by processes running in a highest privilege mode, guest OS space 160 and applications space 162 may be accessed by processes regardless of the setting of the highest privilege mode. In another example, all or portions of both guest OS space 160 and other application space 158 may be shared between applications independent of the privilege mode setting.

In one example, an address register 138 is loaded with an address, effective address (EA) 140 for the memory access request for the current context. EA 140 may include, but is not limited to including, a sign extended field, an effective page number field and an offset field. An effective page number field may include, but is not limited to, a page map level-4 offset field that maps into a page-map level 4 table, a page-directory pointer offset that maps into a page-directory-pointer table, a page-directory offset that maps into a page-directory table, a page-table offset that maps into a page table, and a physical-page offset that maps into a physical page. In additional or alternate examples, EA 140 may include additional or alternate fields, such as a virtual segment identifier (VSID), and may represent a real address or an address that requires multiple levels of translation.

In one example, EA is an N bit effective address in a request by a process for access to address space 154. In one example, address space 154 is partitioned such that the most significant, or top bit of EA, referred to as EA[0] throughout, identifies whether an address is directed to a top half of the address space identified by EA[0]=1, including hypervisor space 156 and guest OS space 160, or directed to a bottom half of the address space identified by EA[0]=0, including other application space 158 and applications space 162. In addition, application space 154 may be partitioned such that the second most significant bit of EA, referred to as EA[1] throughout, may identify additional characteristics of an address space. In one example, hypervisor space 156, may also be referred to as the most privileged address space. In other examples, address space 154 may be partitioned in other ways, where other EA bits or other types of bit settings identify each of the address spaces. In addition, additional bits of the EA may be set for designating partitioned spaces within address space 154. Different processors may use different bit ordering specifications. For example, while in the example illustrated, EA[0] is referred to as the bit that refers to the top half of an address space, in other embodiments, EA[N] may be the bit that refers to the top half of an address space, where bits are referred to from N to 0 or where the processor specifies the ordering of bits in reverse from the order of bits illustrated in the example.

On a context switch, hypervisor 166 may load a PID register 122 of processor core 102 with a value P 124 identifying the process for the current context and may load a LPID register 126 of processor core 102 with a value L 128 identifying the logical partition to which the processor is currently assigned for the current context. In addition, on a context switch, hypervisor 166 or context switching controller 104 may load a machine state register (MSR) 130 with multiple bits including, but not limited to, HV 132. In the example, the setting of MSR[HV] 132 represents the highest privilege mode setting. In one example, when MSR[HV]=1, processor core 102 is set to operate in the highest privilege mode. Additional bit settings within MSR 130 may specify other layers of privilege states. For example, MSR 130 may also include a problem state (PR) bit, set with HV 132, for further specifying a privilege mode, where the PR bit indicates whether processor core 102 is set to operate in a supervisor mode (PR=0) or a problem state mode (PR=1). For example, a hypervisor state, which runs in the highest privilege mode, may be indicated by MSR[HV|PR]=10, an OS state that runs in a privileged mode less than the highest privilege mode, may be indicated by MSR[HV|PR]=00, and the applications running under the hypervisor and the applications running under the OS may run in a least privileged mode, and may be indicated by MSR[HV|PR]=11 and MSR[HV|PR]=01, respectively. In another example, MSR 130 may also include IR/DR bits 133 which specify whether to turn on or turn off translations by the TLB controller. In one example, the IR bit enables or disables instruction address translation and the DR bit enables or disables data address translations. In other examples, other settings within processor core 102 or hypervisor 166 may control whether or not TLB controller 106 manages a translation. In addition, in the example, hypervisor 166 or context switching controller 144 may load a page table 136 into table register 134, where page table 136 is either a global page table or a specific page table, available for performing page level address conversions for the current context. In one example, hypervisor 166 provides each LPAR with its own hardware page table for loading into page table 136. Alternatively, table register 134 may represent a storage description register, such as SDR1, that specifies the real address and size of the hardware accessed page table for the current partition. In additional or alternate embodiments, the settings designated with MSR 130 may be set within processor core 102 or within hypervisor 166 through additional or alternate components.

In the example, context switching controller 104 may support context switches between different privilege mode settings, such as a switch from a previous context with MSR [HV] 132 set to "1" to a current context with MSR[HV] 132 set to "0". Context switching controller 104 may also support context switches between different logical partitions, such as a switch from a previous context with L 128 set to "LPAR1", the identifier for LPAR 170, to a current context with L 128 set to "LPAR2", the identifier for LPAR 176. In another example, context switching controller may also support context switches between different processes within a logical partition, such as a switch from a previous context with P 124 set to a process identified as "2" to a current context with P 124 set to a process identified as "4". Context switching controller 104 may support context switches where one or more of P 124, L 128, and HV 132 change, along with changes to EA 140, page table 136, and additional registers set within processor core 102.

In one example, each context may make requests that require a memory access request to an address EA 140 loaded in address register 138, where the address requires one or more levels of translation using one or more levels of page tables 136 and other functions, to identify the real memory address associated with the address. In one example, computer system 100 may utilize a virtual memory system to virtually address very large amounts of memory, even though the main memory of the system encompasses a much smaller portion of physical memory address space. In addition, many computer systems use virtual memory systems to manage and allocate memory to various processes running within the system, which allows each process running on the system to operate as if it has control of the full range of addresses provided by the system. The virtual memory addresses may be mapped to physical memory addresses, requiring one or more levels of translation from a virtual address mapping to a physical address using page table 136 and other tables.

In one example, for management of translations of virtual memory to physical addresses, processor core 102 may implement a specialized cache to store previous translations of virtual addresses to physical addresses accessed from a page table. For example, TLB 142, which may be positioned within a small section of memory in a processor pipeline, easily accessible to the processor, caches part of the virtual address to physical address translation within computer system 100. In one example, the specialized cache implemented for TLB 142 is separate from the L1 and L2 cache and only stores TLB 142. By storing recently mapped virtual address to physical address translations in TLB 142, upon a next request for the same virtual address, TLB controller 106 can quickly access a translation of the virtual address into a physical address from a previously stored entry in the TLB. If a translation for a particular virtual address is not present in the TLB, a "translation miss" occurs and the address translation is resolved from page tables. In particular, in the example illustrated, TLB controller 106 generates a virtual address (VA) 112 for a current context requiring translation of EA 140 into a real memory address. In one example, hypervisor 166 may be set to handle translation of particular types of address requests into a real memory address using functions independent of TLB controller 106, such that TLB controller 106 may not be required to perform address translation for the particular types of address requests. For example, an optional setting of hypervisor 166 may be set such that when MSR[HV]=1 and MSR[IR/DR]=0, translation through TLB controller 106 is turned off and the hypervisor real mode address mechanism controls the address translation and access. In the example illustrated, TLB controller 106 is illustrated as component of processor core 102, however, in alternate examples, the functions described herein as performed by TLB controller 106 may be performed by other functional units including, but not limited to, hardware, software and firmware.

For the address translations handled by TLB controller 106, a first context selection controller 108 selects a value for LPID 114 of VA 112 and a second context selection controller 110 selects a value for PID 116 of VA 112. In addition, TLB controller 106 selects all or a portion of EA 140, as EA 118 in VA 112, such as a portion EA[X:N], where X may represent a bit other than the first bit of EA. EA 118 may also represent a portion of EA where other portions of EA[N] are not included in VA 112, such as EA[X:N−7]. In addition, EA 118 may be segmented into one or more subfields.

In the example, TLB controller 106 compares VA 112 with one or more entries within a TLB 142. In the example TLB 142 includes a TLB entry 144 with multiple fields. In one example, the fields of TLB entry 144 include, but are not limited to, TLB LPID 146, TLB PID 148, TLB EA 150, and a real page number 152. In the example, each TLB entry 144 within TLB 142 includes the VA of the context during which real page number was translated for a particular address request. In particular, TLB controller 106 compares LPID 114 with TLB 146, PID 116 with TLB PID 148, and EA 118 with TLB EA 150. If each of the compared values matches, a TLB hit is triggered and real page number 152 is accessed as the real page number translated for VA 112. In one example, real page number 152 is further translated into a real memory address using page table 136. In the example, if one or more of the compared values do not match, after all the TLB entries are compared, a TLB miss is triggered and TLB controller 106 may call one or more hardware and software mechanisms for translating VA 112 into a real page number. TLB controller 106 then stores a new TLB entry with VA 112 and the translated real page number for satisfying future translation requests.

In one example, each TLB entry 144 includes TLB LPID 146 and TLB PID 148, which each identify characteristics of a context, such that for a context switch, TLB entries may be maintained within TLB 142 and for each TLB lookup within TLB 142, only those entries with the same context characteristics selected within VA 112, will trigger a TLB hit. In the example, first context selection controller 108 and second context selection controller 110 may also specify LPID 114 and PID 116 with values that when included in a TLB entry as TLB LPID 146 and TLB LPID 148 allow TLB controller 106 to manage TLB 142 with entries specified for contexts with different highest privilege mode settings, entries shareable by contexts with different processes accessing a same shared address space, and entries specified for a particular LPAR and a particular process.

In additional or alternate embodiments, additional areas of shared address space may be specified within address space 154, additional current context characteristics may be specified based on one or more additional values set context registers 120, additional characteristics may be represented within first level current context characteristic 108 and second level current context characteristic 110 based on additional data read from context registers 120, additional effective address space identifiers may be set, and TLB entry 144 may include additional address space identifier fields. In one example, additional areas of shared address space may be managed, such as additional address spaces identified by other bits within EA, and additional privilege levels may be managed. Those of ordinary skill in the art will appreciate that while address space 154 is described with reference to EA[0] as the top bit that distinguishes the address spaces within address space 154, in other embodiments, other orderings or configurations of bits within address space 154 may be implemented and therefore the top bit or bits that distinguish the address spaces within address space 154 may be referenced as EA[N] or another bit of the address space addressing.

In one example, while TLB controller 106 creates and maintains entries within TLB 142 for multiple contexts, to reduce or eliminate the need to flush TLB 142 on context switching and to eliminate redundant entries directed to shareable address space, one or more of hypervisor 166, context switching controller 104, TLB controller 106, or other components may also determine and trigger caching of the contents of TLB 142, flushing the contents of TLB 142, restoring TLB 142 with previously cached contents, and performing other cache management functions for TLB 142. In addition, in the example, while TLB controller 106 may create and maintain entries within TLB 142 to eliminate redundant entries directed to shareable address space by specifying LPID 114 through first context selection controller 108 and by specifying PID through second context selection controller 110, in another example, TLB controller 106 may turn off one or more of first context selection controller 108 and second context selection controller 110 and automatically set one or more of LPID 114 to L 128 and PID 116 to P 124 and VA 112 may be stored as an entry within TLB 142 that is specified for access by a particular context and not shareable across multiple contexts, regardless of whether the entry is directed to shareable address space.

Those of ordinary skill in the art will appreciate that computer system 100 is representative of one computer environment in which the invention may be implemented. In additional or alternate embodiments, computer system 100 may include additional or alternate network layers, additional or alternate LPARs or other groupings of physical and virtualized resources implemented within additional or alternate network layers, additional or alternate hypervisor or firmware layers, additional or alternate components within processor core 102, additional processor cores accessing a same TLB, additional or alternate TLBs, additional or alternate context registers for performing additional or alternate functions and additional or alternate address space and classifications of address space.

Figure 2:
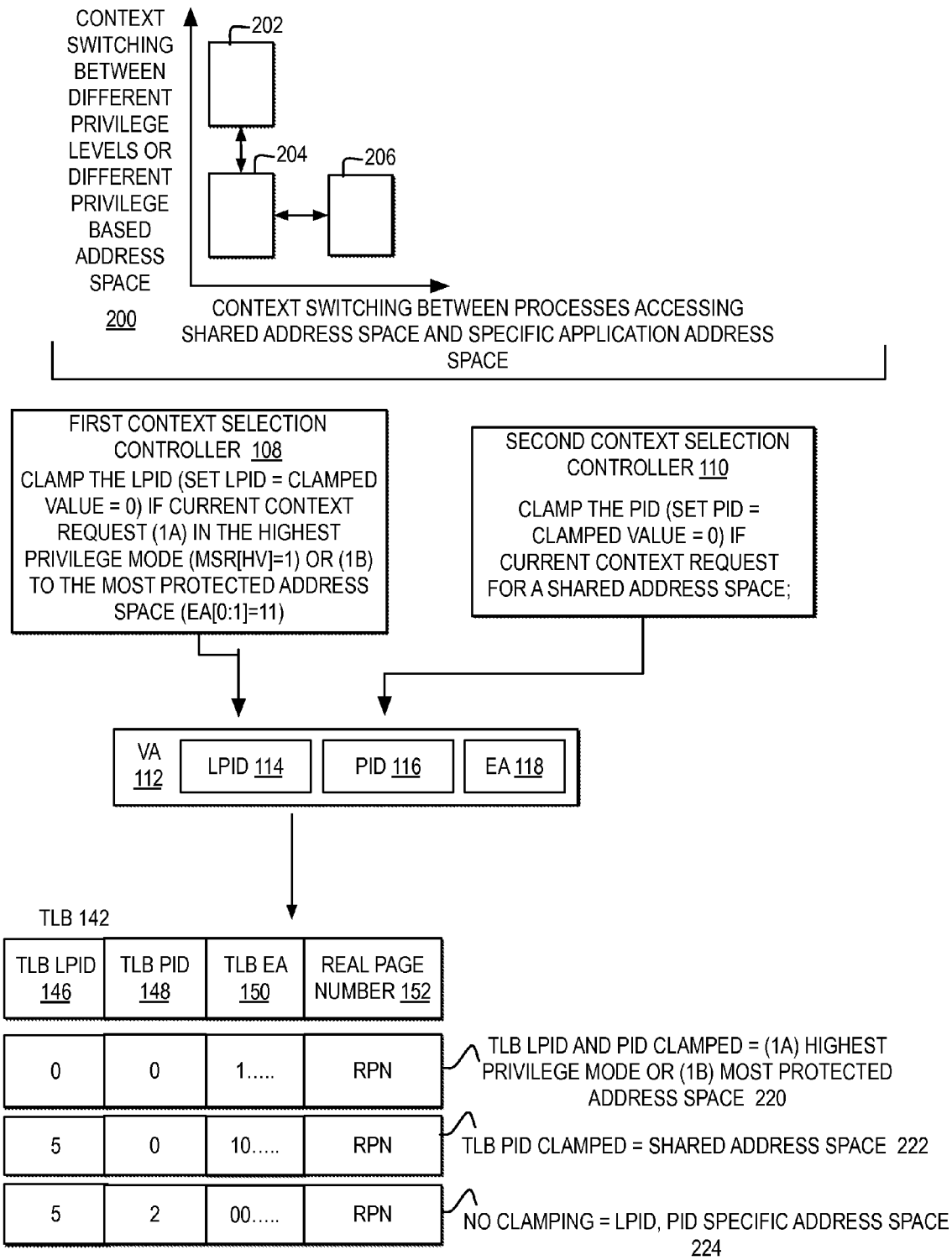
FIG. 2 is a block diagram illustrating one example of a TLB controller for managing translation of a same address across multiple contexts using a same entry in a TLB and for managing TLB entries available to different privilege levels within a same TLB.

FIG. 2 illustrates a block diagram of a TLB controller for managing translation of a same address across multiple contexts using a same entry in a TLB and for managing TLB entries available to different privilege levels within a same TLB.

In the example, first context selection controller 108 and second context selection controller 110 of TLB controller 106 set values for LPID 114 and PID 116, respectively, to enable managing a TLB with entries available for multiple types of context switches. In one example, first context selection controller 108 and second context selection controller 110 select values to support a range of types of context switches illustrated at reference numeral 200. For example, as illustrated at reference numeral 200, the range of context switches may include context switching between different privilege levels, such as switching from a context 202 set to a highest privilege level to a context 204 set to a privilege mode that is not the highest privilege level. In the example, context switching between different privilege levels may also include switching between context requests to address space controlled by a highest privilege mode setting and context request to address space not controlled by a highest privilege mode setting. In addition, as illustrated at reference numeral 200, the range of context switches may include context switching between applications requesting shared address space and applications requesting application specific address space, such as switching from a context 204 for an application request to a shared address space and a context 206 for an application request to an application specific address space. Context switches may also include switching between both privilege modes and types of address space. Context switches may include any change within processor core 102 that requires an address lookup by TLB controller 106, including switching between accesses to different segments within a same address space or different address spaces.

Figure 3:
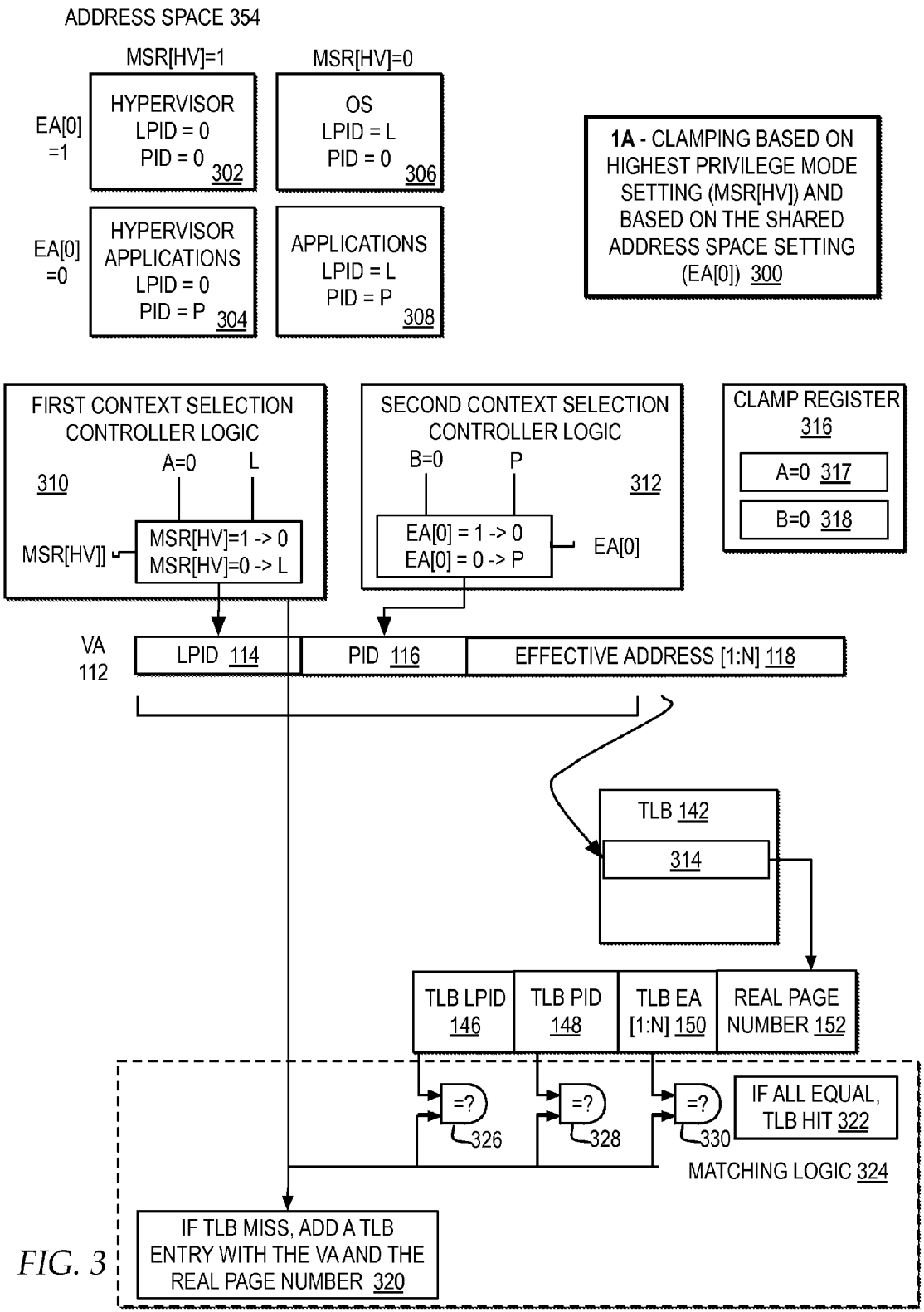
FIG. 3 is a block diagram illustrating one example of components of a TLB controller for managing translations using a TLB in a processor and managing a TLB with entries available for contexts with different privilege levels, in an example where address translation by the TLB controller may be turned off for hypervisor access to non-hypervisor partitioned address space.
Figure 4:
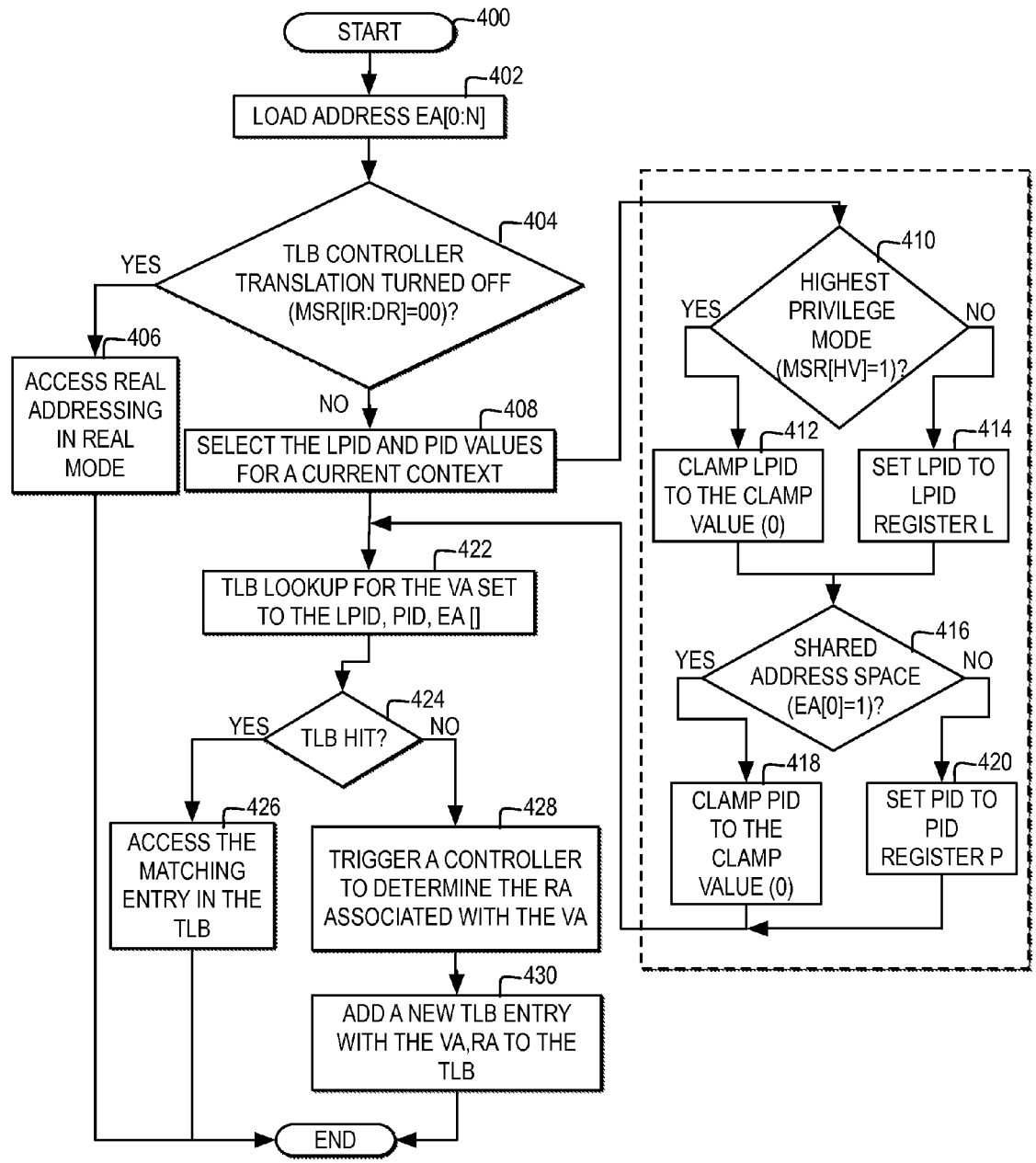
FIG. 4 is a high level logic flowchart illustrating one example of a process and program for managing translation of a same address across multiple contexts using a same entry in a TLB and managing a TLB with entries available for contexts with different privilege levels, in an example where address translation by the TLB controller may be turned off for hypervisor access to non-hypervisor partitioned address space.
Figure 5:
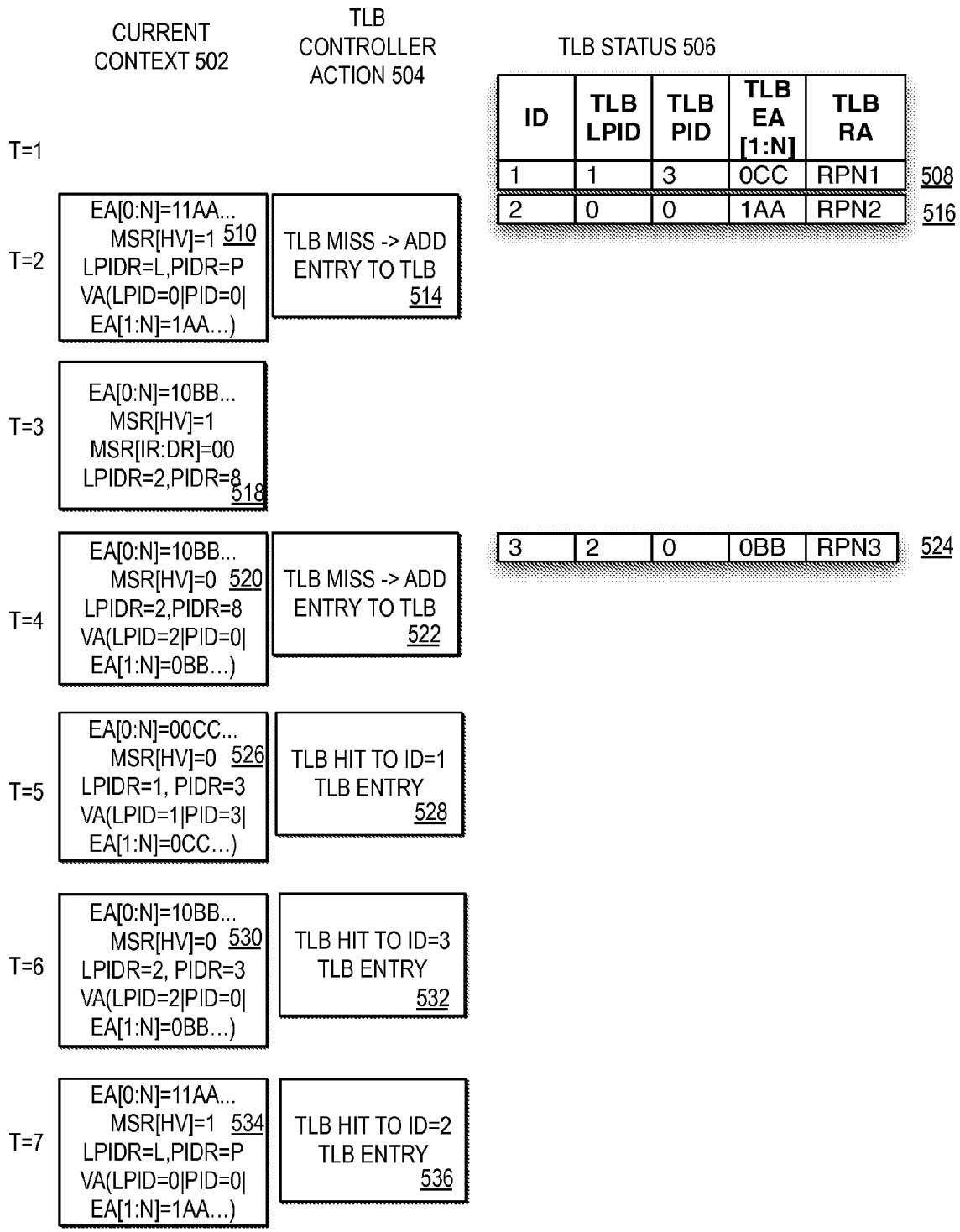
FIG. 5 is a block diagram illustrating one example of a TLB controller managing translation of a same address across multiple contexts using a same entry in a TLB and managing a TLB with entries available for contexts with different privilege levels and managing a TLB with entries available for contexts with different privilege levels, in an example where address translation by the TLB controller may be turned off for hypervisor access to non-hypervisor partitioned address space.
Figure 6:
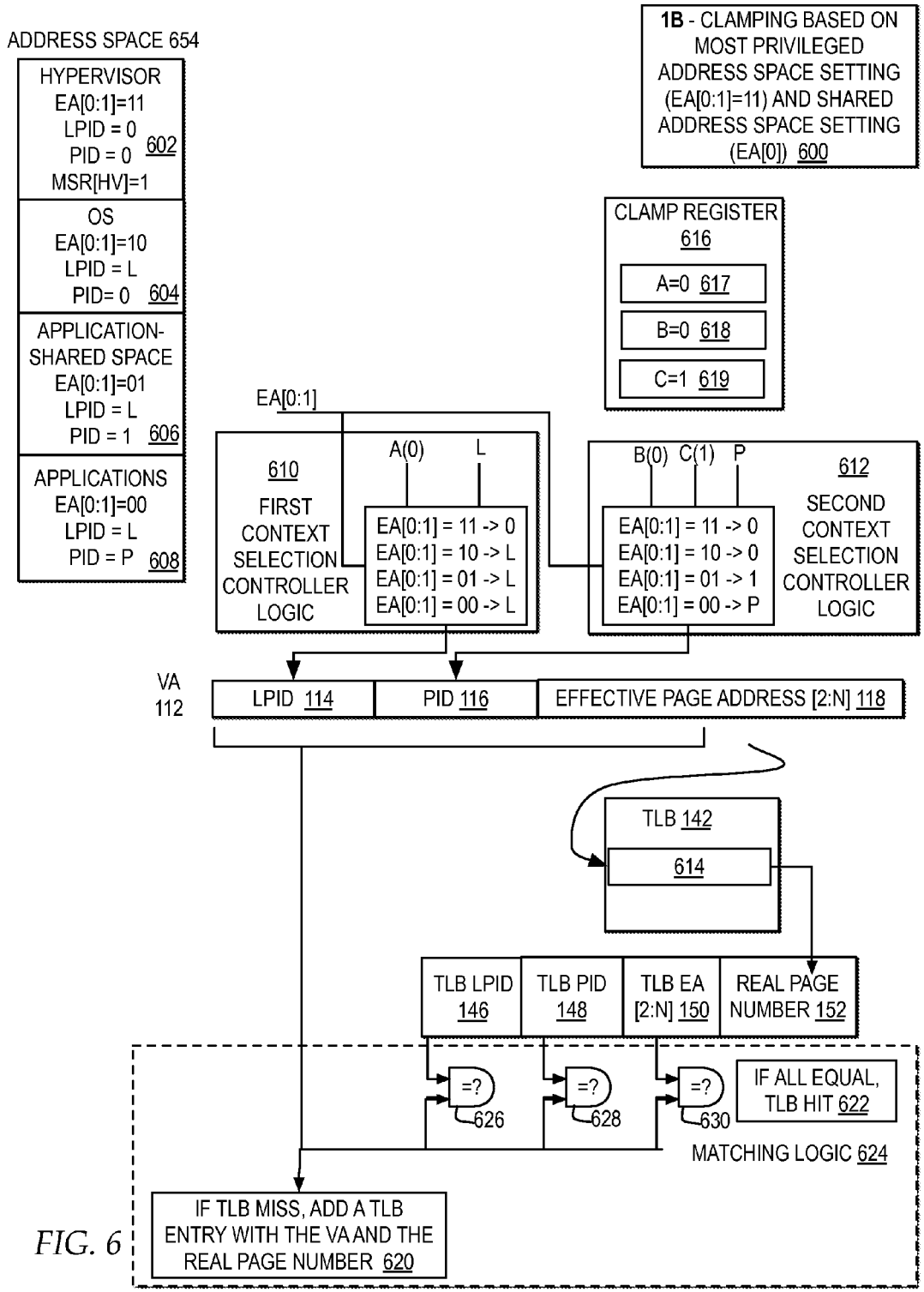
FIG. 6 is a block diagram illustrating one example of components of a TLB controller for managing translations using a TLB in a processor of a same address across multiple contexts using a same entry in a TLB and managing a TLB with entries available for contexts with different privilege levels, where address translations to non-hypervisor partition address space are performed by the TLB controller independent of a highest privilege mode setting.
Figure 7:
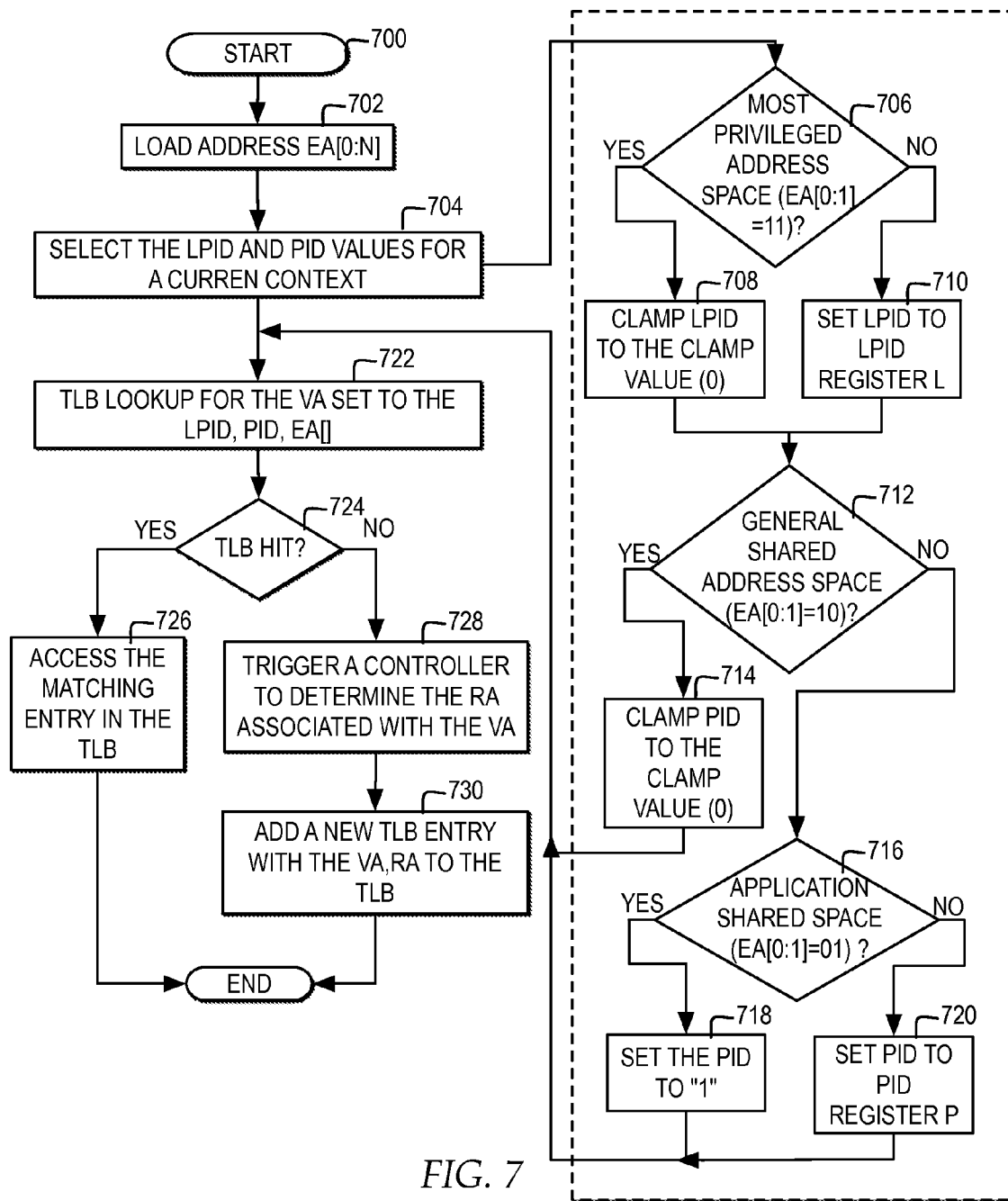
FIG. 7 is a high level logic flowchart illustrating one example of a process and program for managing translation of a same address across multiple contexts using a same entry in a TLB and managing a TLB with entries available for contexts with different privilege levels, where address translations to non-hypervisor partition address space are performed by the TLB controller independent of a highest privilege mode setting.
Figure 8:
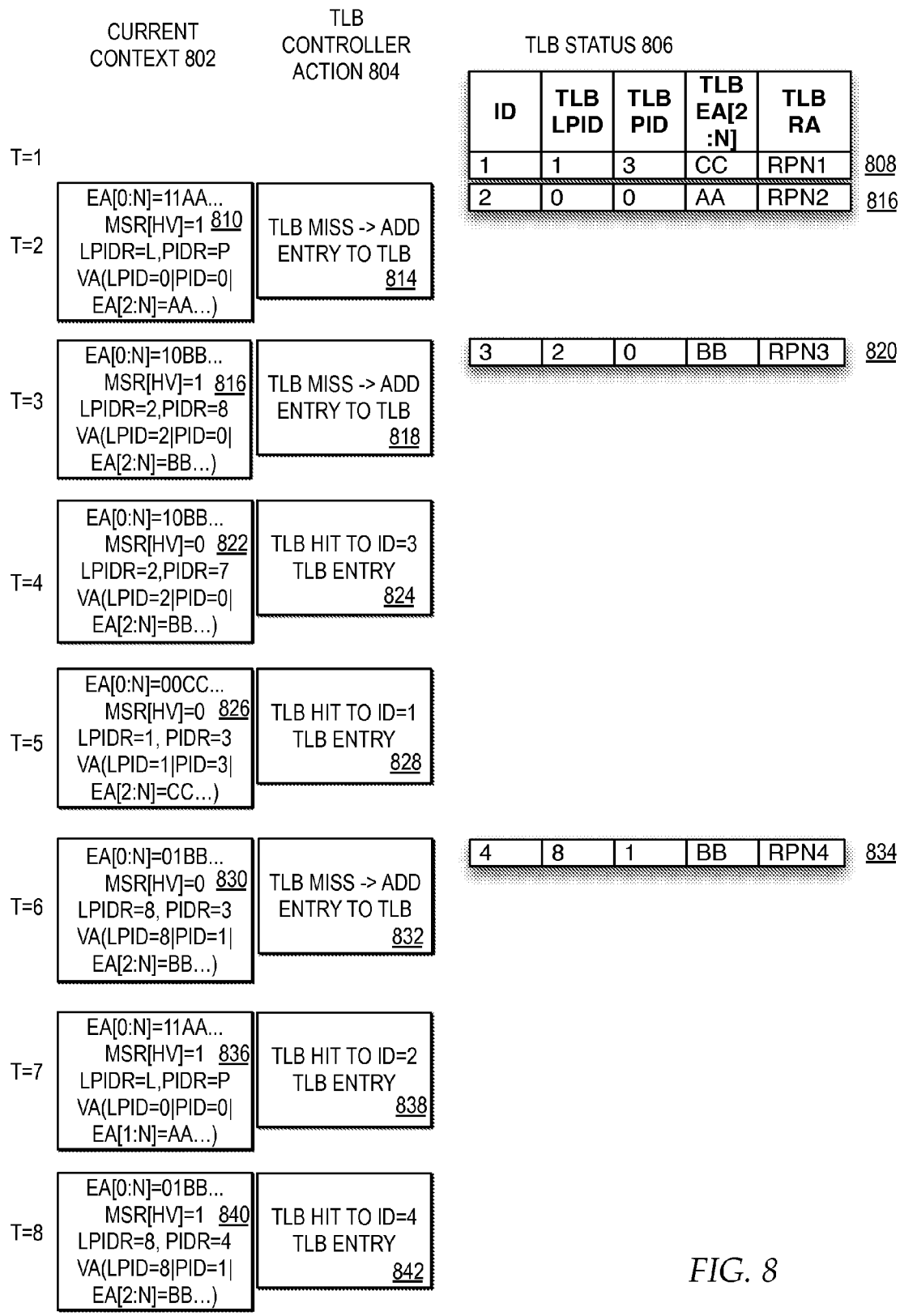
FIG. 8 is a block diagram illustrating one example of a TLB controller managing translation of a same address across multiple contexts using a same entry in a TLB and managing a TLB with entries available for contexts with different privilege levels, where address translations to non-hypervisor partition address space are performed by the TLB controller independent of a highest privilege mode setting.

In particular, in the example, first context selection controller 108 and second context selection controller 110 may support the range of types of context switches by setting clamped values in LPID 114 and PID 116, respectively, when the current context characteristics match a particular selection of context characteristics. In addition, first selection controller 108 and second selection controller 110 may require one selection of context characteristics, labeled as case "1A" throughout, if the context is operating in the highest privilege mode with TLB controller translations turned off for non-hypervisor partition address space, and another selection of context characteristics, labeled as case "1B" throughout if the hypervisor turns translations on and TLB controller 106 manages requests in the highest privilege mode to non-hypervisor partition address space. In the example, FIGS. 3-5 illustrate examples related to case "1A" and FIGS. 6-8 illustrate examples related to case "1B".

In one example, first context selection controller 108 may clamp the LPID by setting LPID 114 to a clamped value of "0" following the two selections of context characteristics, depending on which controller handles requests in the highest privilege mode to non-hypervisor partition space. A first selection of context characteristics labeled under case "1A", directs first context selection controller 108 to clamp the LPID if the current context request is set to the highest privilege mode. A second selection of context characteristics labeled under case "1B", directs first context selection controller 108 to clamp the LPID if the current context request is directed to the most protected address space. In another example, the clamped value for clamping LPID 114 may be set to a value other than "0". Effectively, by clamping LPID 114 to "0" for accesses for case "1A" or "1B", the LPID for the hypervisor partition is set to "0".

In one example, second context selection controller 110 may clamp the PID by setting PID 116 to a clamped value of "0" if the current context request is directed to a shared address space within hypervisor space 156 or guest OS space 160. Effectively, by clamping PID 116 to "0" for requests directed to a shared address space, requests to the kernel space disregard the identifier of the process making the request. In an alternate example, the clamped value for clamping PID for shared address space requests may be set to a value other than "0". In addition, as will be described with reference to FIGS. 6-8, for a second selection of context characteristics labeled under "1B", PID 116 may also be set to a clamped value of "1", or another clamped value different from the clamped value for a shared address space within other application space 158, in the example case where other application space 158 is provided as an additional application-shared address space.

In the example, if TLB controller 106 detects a TLB miss for a particular VA, TLB controller 106 uses one or more functions to look up the real page number for the VA using page tables and other tables and then adds an entry to TLB 142 with the contents set in the VA. For example, TLB LPID 146 is set to LPID 114, TLB PID 148 is set to PID 116 and TLB EA 150 is set to EA 118. By setting the TLB entry with a VA selected by first context selection controller 108 and second context selection controller 110, the determination as to whether to set TLB LPID 146 or TLB PID 148 to a clamped value is effectively determined prior to any TLB lookup and is effectively determined using the same set of context characteristics that also determine whether to clamp the same values in VA 112 for a subsequent context.

In the example, TLB 142 may include entries directed to multiple privilege levels or different privilege based address space, entries directed to shared address spaces, and entries directed to application specific space.

In one example, a first entry 220 shows an example of a TLB entry for a context set to a highest privilege mode setting and hypervisor space 156 for case "1A" or for a context directed to a most protected address space (hypervisor space 156) for case "1B", where TLB LPID 146 and TLB PID 148 are both clamped. In the example, entry 220 may trigger a TLB hit for any subsequent context in which first context selection controller 108 sets LPID 114 to a clamped value of "0" and in which second context selection controller 110 sets PID 116 to a clamped value of "0". Effectively, a subsequent context that triggers a TLB hit to entry 220 will include context registers loaded with MSR[HV]=1 and EA[0]=1 and the values of LPID and PID are disregarded, such that the translation in entry 220 is shareable by multiple processes operating under MSR[HV]=1 and directed to hypervisor space 156.

In one example, a second entry 222 shows an example of a TLB entry for a context directed to a general shared address space, such as guest OS space 160, where TLB LPID 146 is set to a particular LPAR labeled "5" and TLB PID 148 is clamped to "0". In the example, entry 222 may trigger a TLB hit for any subsequent context in which first context selection controller 108 does not clamp LPID 114, but sets LPID 114 to a value in an LPIDR that matches TLB LPID 146, and in which second context selection controller 110 sets PID 116 to a clamped value of "0". Effectively, a subsequent context that triggers a TLB hit to entry 222 will include context registers loaded with LPIDR=5 and EA[0]=1 and the value of PID is disregarded, such that the translation in entry 222 is shareable by multiple processes within a particular logical partition.

In one example, a third entry 224 shows an example of a TLB entry for a context directed to an application specific space, such as applications space 162, where TLB LPID 146 is set to a particular LPAR labeled "5" and TLB PID 148 is set to a process labeled "2". In the example, entry 224 may trigger a TLB hit for any subsequent context in which first context selection controller 108 does not clamp LPID 114, but sets LPID 114 to a value in LPIDR that matches TLB LPID 146, and in which second context selection controller 110 does not clamp PID 116, but sets PID 116 to a value in PIDR that matches TLB PID 148. Effectively, a subsequent context that triggers a TLB hit to entry 224 will include context registers loaded with LPIDR=5, PIDR=2 and EA[0]=0.

In the example, while in other embodiments a TLB controller may support setting a clamped value of "0" within TLB LPID 146 or TLB PID 148 of a TLB entry, and a clamped value of "0" identifying a shared TLB entry regardless of the value set in the VA for LPID 114 or PID 116, for subsequent comparisons to the TLB entry, the TLB controller will identify a match between any value compared in the correlating field in the VA with the clamped value of "0" in the TLB entry, the overhead placed on the TLB controller to identify a match between any value compared with a clamped value of "0" in the TLB entry, and to perform this computation for each TLB entry comparison, exceeds the logic required to identify a match between a field set to "0" and another field set to "0", as described in the comparison performed in FIG. 2. In the example illustrated in FIG. 2, by setting clamped values in VA 112, the determination of whether a VA may access a shared TLB entry is set in VA 112.

FIG. 3 illustrates one example of a block diagram of components of a TLB controller for managing translations using a TLB in a processor and managing a TLB with entries available for contexts with different privilege levels, in an example where address translation by the TLB controller is turned off for hypervisor access to non-hypervisor partitioned address space.

In the example, as illustrated at reference numeral 300, the example illustrated represents an option labeled as "1A" in FIG. 2, which provides clamping based on the highest privilege mode setting (MSR[HV]) and clamping based on the shared address space setting (EA[0]). In the example, for the current context, an address EA[0:N] requires translation into a real address (RA).

In one example, an address space 354 may be characterized both by the highest privilege mode setting (MSR[HV]) and the shared address space setting (EA[0]). For example, within address space 354, a hypervisor partition space that includes hypervisor space 302 and hypervisor applications space 304 may be characterized by a highest privilege mode setting of MSR[HV]=1. In the example, hypervisor space 302 is further characterized by a shared address space setting of EA[0]=1, indicating shared space, and hypervisor applications space 304 is further characterized by a shared address setting of EA[0]=0, indicating that the space is hypervisor application specific within the hypervisor partition. In addition, within address space 354, a non-hypervisor address space allocated to one or more logical partitions, which includes OS space 306 and application space 308, may be characterized by not being set to a highest privilege mode setting of MSR[HV]=1. In the example, OS space 306 is further characterized by a shared address space setting of EA[0]=1, indicating shared space, and applications space 308 is further characterized by a shared address setting of EA[0]=0, indicating that the space is application specific within a logical partition.

In the example, a clamp register 316 may logically represent bits of other registers within a processor or may represent specific registers set for clamp register 316. In one example, clamp register 316 may include a clamp register A 317 and a clamp register B 318. In the example, both clamp register A 317 and clamp register B 318 are set to "0", each of which represents a clamped value. In other examples, clamp register A 317 and clamp register B 318 may be implemented as a single register, rather than separate registers. In other examples, clamp register A 317 and clamp register B 318 may be set to values other than "0".

In the example, first context selection controller logic 310 may include a switch or other selection controller that includes an value read from the MSR[HV] register as the control input for selecting between an input of clamp register A 317, set to "0", the clamped value, and L, the value loaded into the LPID register for the current context. The output of first context selection controller logic 310 sets the value within LPID 114 of VA 112. In the example, if the value read from the MSR[HV] register is "1", then first context selection controller logic 310 outputs a "0", a clamped value. In the example, if the value read from the MSR[HV] register is "0", then first context selection controller logic 310 outputs "L", the value read from the LPID register.

In the example, second context selection controller logic 312 may include a switch or other selection controller that includes a value read from the EA[0] bit of the EA[0:N] address register as the control input for selecting between an input of clamp register B 318, set to "0", the clamped value, and P, the value loaded into the PID register for the current context. The output of second context selection controller logic 312 sets the value within PID 116 of VA 112. In the example, if the value read from EA[0] is "1", then second context selection controller logic 312 outputs a "0", a clamped value. In the example, if the value read from EA[0] is "0", then second context selection controller logic 312 outputs a "P", the value read from the PID register.

In the example, address space 354 illustrates, for the logic applied in first context selection controller logic 310 and second context selection controller logic 312, the LPID and PID settings applied for each type of address space, reflecting the MSR[HV] and EA[0] characteristics of each address space. For example, for address requests received for a context operating with MSR[HV]=1, if EA[0]=1, as illustrated within hypervisor space 302, then the LPID and PID are both clamped to "0" in a VA for the address request, and, if EA[0]=0, as illustrated within hypervisor applications space 304, then the LPID is clamped to "0" and the PID is set to the PID register value P for the address request. For example, for address requests received for a context operating with MSR[HV]=0, if EA[0]=1, as illustrated within OS space 306, then the LPID is set to the LPID register value L and the PID is clamped to "0" in a VA for the address request, and, if EA[0]=0, as illustrated within applications space 308, then the LPID is set to the LPID register value L and the PID is set to the PID register value P for the address request.

In the example illustrated, if the highest privilege mode setting for a current context is set to the highest privilege mode by setting MSR[HV]=1, but the address for a memory request is directed to the address space within OS space 306 or applications address space 308, the hypervisor may set MSR[IR/DR] to "0" to turn off translations by the TLB controller and perform translations of the address for a memory request into a real address, functioning in a real addressing mode controlled by the hypervisor. In the example, effectively, if LPID 114 is set to a clamped value of "0", the clamped value of "0" is effectively the LPID for the hypervisor partition of address space identified by hypervisor space 302 and hypervisor applications space 304.

In the example, VA 112 is compared with each entry of TLB 142, such as an entry 314, by matching logic 324. In one example, matching logic 324 includes a comparator gate 326, such as an AND gate or an XNOR gate, for outputting a value indicating whether LPID 114 matches TLB PID 146 of entry 314, a gate 328 for outputting a value indicating whether PID 116 matches TLB PID 148 of entry 314, and a gate 330 for outputting a value indicating whether EA 118 matches TLB EA 150. As illustrated at reference numeral 322, if all the outputs from gate 326, gate 328, and gate 330 indicate the compared fields of VA 112 match the compared fields of entry 314, then a TLB hit signal is output and real page number 152 from the entry triggering the TLB hit is read as the RA translation for the VA. In another example, matching logic 324 may implement logic to enable performing an overarching AND comparison of the XNOR comparison of the bits being compared through comparator gate 324, compactor gate 326, and comparator gate 328. For example, to determine whether VA matches TLB LPID 146, TLB PID 148, and TLB EA 150, matching logic 324 may include logic for performing "AND_REDUCE(NOT(VA XOR TLB LPID 146|TLB PID 148|TLB EA 150))". While in the example illustrated, EA 118 is illustrated as including bits [1:N] of the total bits EA [0:N] and TLB EA 150 may include bits [1:N], in additional or alternate examples, EA 118 may include bits [0:N], TLB EA 150 may include bits [0:N], and VA 112 and TLB entry 314 may each include additional bits that are only selectively compared against one another, to enable a system in which clamping can be enabled or disabled. For example, when clamping is enabled, the additional bits may not be compared against one another when VA 112 is compared against the entries within TLB 142.

In the example, if none of the entries in TLB 142 yield a TLB hit as illustrated at reference numeral 322, then as illustrated at reference numeral 320, a TLB miss is triggered. If a TLB miss is triggered, mechanisms for tracing through page tables and other addressing tables may be triggered to trace an RA for a VA. In one example, mechanisms for tracing an RA to a VA may include raising a page fault exception, which is handled by a guest OS or hypervisor. In one example, once an RA is traced for a VA, a TLB entry is added to TLB 142 with the VA and the real page number for the RA identified for the VA. In the example, the time required to search TLB 142 and determine that a miss has occurred may be less than the time required to trace an RA for a VA through one or more types of mechanisms, such that once an RA has been traced for a VA, maintaining a TLB entry with the traced RA for the VA within TLB 142 across context switching eliminates redundant tracing of RA's for VA's across context switches.

In the example illustrated, TLB 142 may include TLB entries for contexts of different privilege levels, such that for context shifts between different privilege levels, the TLB entries for contexts of different privilege levels may all remain within TLB 142, but the current context may only receive a TLB hit to TLB entries entered for a previous context of the same privilege level. For example, TLB 142 may include an entry for an address translated from hypervisor space 302, added for a context with a highest privilege level setting of MSR[HV]=1, and an entry for an address translated from OS space 306, added for a context where MSR[HV]=0. In the example, all the entries within TLB 142 with TLB LPID 146 marked to "0" represent TLB entries for translating address space requests by contexts with MSR[HV]=1. In the example, all the entries within TLB 142 with TLB LPID 146 marked to a value other than "0" represent TLB entries for an translating address space request for a current context not operating in the highest privilege level, but the current context may only receive a TLB hit to TLB entries entered for a previous context from a same LPAR, with a same value L loaded into the LPID register.

In the example illustrated, TLB 142 may also include TLB entries for contexts of a same privilege level, with specific entries for any application specific address space only accessible by a specific process operating within a specific LPAR, but with a same, single entry for any shared address space accessible by all processes operating within a specific LPAR. For example, TLB 142 may manage a single entry for access by multiple contexts operating at a same privilege level and accessing a same shared address space, independent of the PID register value of the process originally triggering the creation of the TLB entry. In the example, all the entries within TLB 142 with TLB LPID 146 marked to a value other than "0" and TLB PID 148 marked to "0" represent shared TLB entries for translating all process requests to OS space 306 for the designated LPID. In the example, all entries within TLB 142 with TLB PID 148 marked to a value other than "0" represent TLB entries for translating an address space request for a current context that is requesting access to an address space that is application specific.

In the example, by storing TLB entries within TLB 142 that may include clamped values in TLB PID 148 and by also clamping PID 116 in VA 112 for a request to shared access space, a single, direct comparison, using a simple logic gate, may be made between PID 116 and TLB PID 148 to determine a TLB hit to an entry within matching logic 324. In contrast, if TLB PID 148 were set to a clamped value of "0" to allow for sharing of the entry among processes, but clamping was not also performed in the value set for PID 116 when EA[0]=1, matching logic 324 would require logic for each comparison to first determine if PID 116 matched TLB PID 148, as illustrated, but would also require additional logic for comparing the TLB PID within each entry within TLB 142, to determine whether TLB PID is equal to zero and output a match value. Additional logic within matching logic 324 increases the computational overhead of the TLB controller for every entry compared for a TLB lookup of a particular VA. In contrast, in the example illustrated in FIG. 3, by setting PID 116 to a clamped value within VA 112 when EA[0]=1, second context selection controller logic 312 effectively provides a single computational step for determining whether the VA can have a TLB hit to a TLB entry with TLB PID 148 set to a clamped value of "0", which is more efficient than making this determination within matching logic 324 for each TLB entry comparison. In addition, in the example illustrated in FIG. 3, by setting PID 116 to a clamped value within VA 112 when EA[0]=1, second context selection controller logic 312 effectively provides the single computational step for also setting TLB PID 148 if there is a TLB miss, prior to the TLB lookup starting, because TLB PID 148 will be set to the clamped value in PID 116 if there is a TLB miss, which is more efficient than TLB controller logic determining whether TLB PID 148 should include a clamped value after a TLB miss occurs.

In the example, by storing TLB entries within TLB 142 that may include clamped values in TLB LPID 146 and by also clamping LPID 114 in the VA for a context operating in the highest privilege mode, a single, direct comparison, using a simple logic gate, may be made between LPID 114 and TLB LPID 146 to determine a TLB hit to an entry within matching logic 324. In contrast, if TLB LPID 146 were set to a clamped value of "0" to designate an entry as only accessible to a context operating with in the highest privilege mode, but clamping was not also performed in the value set for LPID 114 when MSR[HV]=1, matching logic 324 would require logic for each comparison to first determine if LPID 114 matched TLB LPID 146, as illustrated, but would also require additional logic for comparing the value of MSR[HV] for a context with a flag value set to identify the privilege level required for access to an entry, to determine whether to output a match value for an access. Additional logic within matching logic 324 increases the computational overhead of the TLB controller for every entry compared for a TLB lookup of a particular VA. In contrast, in the example illustrated in FIG. 3, by setting LPID 114 to a clamped value within VA 112 when MSR[HV]=1, first context selection controller logic 310 effectively provides a single computational step for clamping the LPID to "0", to designate the LPID value of 0 for accesses to hypervisor space 302, which is more efficient than making this determination within matching logic 324 for each TLB entry comparison. In addition, in the example illustrated in FIG. 3, by setting LPID 114 to a clamped value within VA 112 when MSR[HV]=1, first context selection controller logic 310 effectively provides the single computational step for also determining TLB LPID 148 clamping value to set a clamped value in TLB PID 148 if there is a TLB miss and a TLB entry is added for the request, prior to the TLB lookup starting, which is more efficient than TLB controller logic determining whether TLB PID 148 should include a clamped value after a TLB miss occurs. In addition, in the example illustrated in FIG. 3, by setting LPID 114 within VA 112 to a clamped value when MSR[HV]=1, second context selection controller logic 312 effectively provides the single computational step for also setting TLB LPID 146 if there is a TLB miss, prior to the TLB lookup starting, because TLB LPID 146 will be set to the clamped value in LPID 114 if there is a TLB miss, which is more efficient than TLB controller logic determining whether TLB LPID 146 should include a clamped value and a privilege flag setting after a TLB miss occurs.

FIG. 4 illustrates one example of a high level logic flowchart of a process and program for managing translation of a same address across multiple contexts using a same entry in a TLB and managing a TLB with entries available for contexts with different privilege levels, in an example where address translation by the TLB controller is turned off for hypervisor access to non-hypervisor partitioned address space.

In the example, the process and program starts at block 400 and thereafter proceed to block 402. Block 402 illustrates loading an address EA[0:N]. In the example, the address space described by address EA[0:N] specifies a first bit EA[0] for designating whether the address space is considered within the kernel space of a logical partition. Next, block 404 illustrates a determination 0. whether TLB controller translation is turned off, such as by determining whether MSR[IR] =0 for an instruction-side access or whether MSR[DR]=0 for a data-side access. At block 404, if TLB controller translation is turned off, then the process passes to block 406. Block 406 illustrates accessing the real addressing for the requested address by the hypervisor managing the translation in real mode, and the process ends. At block 404, if TLB controller translation is not turned off, then the process passes to block 408. In another example, the determination performed by block 404 may be performed by a different process, such that the process illustrated in FIG. 4, without block 404 and block 406, is only triggered if block 404 has been evaluated by another process and the condition in block 404 is not true. For example, a hypervisor may perform the function illustrated by block 404 as a software logic function, whereas a processor may perform other functions of FIG. 4 as hardware logic functions.

Block 408 illustrates selecting the LPID and PID values for a current context by the process passing to block 410. Block 410 illustrates a determination whether a context is set to a highest privilege mode, for example if MSR[HV]=1. At block 410, if the context is set to a highest privilege mode, then the process passes to block 412. Block 412 illustrates clamping the LPID to the clamp value (0), and the process passes to block 416. At block 410, if the context is not set to a highest privilege mode, for example if MSR[HV]=0, then the process passes to block 414. Block 414 illustrates setting the LPID to the LPID register value L, and the process passes to block 416.

Block 416 illustrates a determination whether the address request is directed to a shared address space, for example if EA[0]=1. At block 416, if the address request is directed to a shared address space, then the process passes to block 418. Block 418 illustrates clamping the PID to the clamp value (0), and the process proceeds to block 422. At block 416, if the address request is not directed to a shared address space, then the process passes to block 420. Block 420 illustrates setting the PID to the PID register value P, and the process passes to block 422.

Block 422 illustrates performing a TLB lookup for the VA set to the LPID, the PID, and all of or a portion of the EA, depending on the portion of the EA that is comparable to the TLB EA, such as EA[1:N]. Next, block 424 illustrates a determination whether there is a TLB hit. At block 424, if there is a TLB hit, then the process passes to block 426. Block 426 illustrates accessing the matching entry in the TLB, and the process ends. At block 428, if there is not a TLB hit, then the process passes to block 428. Block 428 illustrates triggering a controller, which may include a software or a hardware controller, to determine the real address (RA) associated with the VA, such as by determining the real page number associated with the EA. In one example, a page fault exception may be triggered and a guest OS or hypervisor will handle the page fault exception. Next, in the example, once an RA is determined, block 430 illustrates adding a new TLB entry to with the VA and RA to the TLB, where the VA is set to the LPID and PID values calculated for the current context.

FIG. 5 illustrates a block diagram of one example of a TLB controller managing translation of a same address across multiple contexts using a same entry in a TLB and managing a TLB with entries available for contexts with different privilege levels in an example where address translation by the TLB controller is turned off for hypervisor access to non-hypervisor partitioned address space.

In the example, at each of multiple times, a current context 502 loaded into a processor is described, including the LPID and PID values set for a VA by a TLB controller, a TLB controller action 504 is illustrated, and a TLB status 506 is illustrated, showing the current TLB entries within a TLB. While in the example illustrated, the current status illustrates TLB EA as including bits [1:N], and the VA at each of the times is illustrated with EA[1:N], in additional or alternate examples, each TLB EA may include bits [0:N], and each VA at each time may include bits [0:N], where the additional bits may be selectively compared against one another. In the examples illustrated, the setting for the TLB translation control parameter MSR[IR:DR] is MSR[IR]=1 or MSR[DR]=1, except as noted in the example for time T=3 in current context 518.

In one example, at time T=1, TLB status 506 illustrates a TLB table with an entry 508, identified by an ID of "1", with a TLB LPID of "1", a TLB PID of "3", a TLB EA of "0CC . . . " and a TLB RA of "RPN1". In the example, TLB entry 508 is directed to an address within applications space 308, specified within a space allocated for a LPAR with an L of "1" and for a process with a P of "3".

In one example, at a time T=2, current context 510 illustrates characteristics of a context and the LPID and PID values set in the VA for the context. In the example of current context 510, the address request EA[0:N]="11AA . . . ", MSR[HV]=1, LPIDR=L, and PIDR=P. In addition, in the example of current context 510, based on the setting of MSR [HV]=1 and EA[0]=1, both the LPID and the PID are clamped to "0". In the example, the TLB controller compares a VA of "0|0|1AA . . . " into the TLB entry and detects a TLB miss. As illustrated at action 514, in response to the TLB miss, an entry is added to the TLB for the VA. In the example, entry 516 is added to the TLB, with and ID of "2", a TLB LPID of "0", a TLB PID of "0", a TLB EA of "1AA . . . " and a TLB RA of "RPN2".

In one example, at a time T=3, current context 518 illustrates characteristics of a context, where the characteristics of the context indicate that translation by the TLB controller is turned off. In particular, current context 518 includes EA[0:N]="10BB . . . ", MSR[HV]=1, LPIDR=2, and PIDR=8, with the TLB translation control parameter set to MSR[IR:DR]=00. In the example, the addressing to "10BB" is an address that is within OS address space 306, however, in the example, translation by the TLB controller is turned off and the hypervisor is set to translate requests to OS address space 306 when in a real mode. In the example, because translation by the TLB controller is turned off, the TLB controller may not add an entry for the context. In another example, when translation by the TLB controller is turned off, the TLB controller may capture the address translation performed by a hypervisor and add a TLB entry for the context.

In one example, at a time T=4, current context 520 illustrates characteristics of a context and the LPID and PID values set in the VA for the context. In the example of current context 520, the address request EA[0:N]="10BB . . . ", MSR[HV]=0, LPIDR=2, and PIDR=8. In addition, in the example of current context 520, based on the setting of MSR [HV]=0 and EA[0]=1, the LPID is set to the value of LPIDR of "2" and the PID is clamped to "0". In the example, the TLB controller compares a VA of "2|0|0BB . . . " into the TLB entry and detects a TLB miss. As illustrated at action 522, in response to the TLB miss, an entry is added to the TLB for the VA. In the example, entry 524 is added to the TLB, with and ID of "3", a TLB LPID of "2", a TLB PID of "0", a TLB EA of "0BB . . . " and a TLB RA of "RPN3". In the example, while the same address space was referenced at time T=3 and time T=4, the translation by the TLB controller at time T=4 is the first entry for the address space because translation was not handled by the TLB controller at time T=3.

In one example, at a time T=5, current context 526 illustrates characteristics of a context and the LPID and PID values set in the VA for the context. In the example of current context 526, the address request EA[0:N]="00CC . . . ", MSR[HV]=0, LPIDR=1, and PIDR=3. In addition, in the example of current context 526, based on the setting of MSR [HV]=0 and EA[0]=0, the LPID is set to the value of LPIDR of "1" and the PID is set to the PIDR value of "3". In the example, the TLB controller compares a VA of "1|3|0CC . . . " into the TLB entry and detects a TLB hit into the TLB entry with an ID=1, which is entry 508. In the example, the TLB may include entry 508 directed to addressing within applications space 308, which is not shared between processes, and entry 508 only triggers a TLB hit for a current context when the current context has the same context characteristics illustrated in current context 526.

In one example, at a time T=6, current context 530 illustrates characteristics of a context and the LPID and PID values set in the VA for the context. In the example of current context 530, the address request EA[0:N]="10BB . . . ", MSR[HV]=0, LPIDR=2, and PIDR=3. In addition, in the example of current context 530, based on the setting of MSR [HV]=0 and EA[0]=1, the LPID is set to the value of LPIDR of "2" and the PID is clamped to "0". In the example, the TLB controller compares a VA of "2|0|0BB . . . " into the TLB entry and detects a TLB hit into the TLB entry with an ID=3, which is entry 524. In the example, the TLB may include entry 524 directed to addressing within OS space 306, which is shared between processes within a particular LPAR, and entry 524 may trigger a TLB hit for any current context with context characteristics of EA[0:N]="10BB . . . ", MSR[HV]=0, LPIDR=2, regardless of the value loaded into the PIDR for the context. For example, when entry 524 is added to the TLB at time T=4, the PIDR in context 520 is set to "8" and at time T=6, when a TLB hit is detected to entry 524, the PIDR in context 530 is set to "3". In the example, by clamping the PID value in the VA to match a stored clamped TLB PID value in TLB entry 524, TLB entry 524 rather than creating a separate TLB entry for context 530, the PID in the VA may be directly matched through a single gate match to the TLB PID value in TLB entry 524 and entry 524 shared by multiple processes.

In one example, at a time T=7, current context 534 illustrates characteristics of a context and the LPID and PID values set in the VA for the context. In the example of current context 534, the address request EA[0:N]="11AA . . . ", MSR[HV]=1, LPIDR=L, and PIDR=P. In addition, in the example of current context 534, based on the setting of MSR[HV]=1 and EA[0]=1, the LPID and PID are both clamped to "0". In the example, the TLB controller compares a VA of "0|0|1AA . . . " into the TLB entry and detects a TLB hit into the TLB entry with an ID=2, which is entry 516. In the example, the TLB may include entry 516 directed to addressing within hypervisor space 302, which is only accessible when MSR[HV]=1, and entry 516 may trigger a TLB hit for any current context with context characteristics of EA[0:N]="11AA . . . " and MSR[HV]=1, regardless of the values loaded into the LPIDR and PIDR for the context. Effectively, by clamping the LPID to "0" for a context in which MSR[HV]=1, anytime the MSR[HV]=1 and the EA is directed to hypervisor space 302, a same entry 516 may be accessed only when the context switches to the highest privileged mode setting.

In the example, TLB status 506 shows that a TLB may concurrently maintain TLB entries directed to multiple privilege levels, TLB entries shared between multiple contexts of a same privilege level, and TLB entries specified for a particular context. For example, entry 516 will only trigger a TLB match when compared to contexts set to the highest privilege level by MSR[HV]=1, in contrast to entry 508 and entry 524, will only trigger a TLB match when compared to contexts not set to the highest privileged level by MSR[HV]=0. On context switches between contexts with MSR[HV]=1 or 0, entry 508, entry 516, and entry 524 may all remain in the TLB. Further, entry 508 and entry 524 are only applicable to contexts set to a same privilege level of MSR[HV]=0, but entry 508 will only trigger a TLB match to a context with a same, specified set of context characteristics and entry 524 is shared to trigger a TLB match for contexts including multiple processes, with different PID, but with a same LPID. On context switches between contexts with MSR[HV]=0, but addressed to shared address spaces and application specific address spaces, entry 508, entry 516, and entry 524 may all remain in the TLB.

FIG. 6 illustrates one example of a block diagram of components of a TLB controller for managing translations using a TLB in a processor of a same address across multiple contexts using a same entry in a TLB and managing a TLB with entries available for contexts with different privilege levels, where address translations to non-hypervisor partition address space are performed by the TLB controller independent of a highest privilege mode setting;

In the example, as illustrated at reference numeral 600, the example illustrated represents an option labeled as "1B" in FIG. 2, which provides clamping based on the most privileged address space setting (EA[0:1]=11) and clamping based on the privilege level within a shared address space setting (EA[0:1]=10 or 01). In the example, for the current context, an address EA[0:N] requires translation into a real address (RA).

In one example, an address space 654 may be characterized by the most privileged address space setting (EA[0:1]=11), by an application-shared address space setting (EA[0:1]=01), by a general shared address space setting (EA[0:1]=10), and by an application specific address space setting (EA[0:1]=00). For example, within address space 654, a hypervisor space 602 that may only be accessible when the processor is operating in a highest privilege mode setting of MSR[HV]=1, is characterized by an address space setting of EA[0:1]=11, which is the most privileged address space. In addition, within address space 654, a non-hypervisor address space allocated to one or more logical partitions, which includes OS space 604, application-shared space 606, and applications space 608, may be accessible to contexts with a highest privilege mode setting of MSR[HV]=0 or 1. In the example, OS space 604 is further characterized by an address space setting of EA[0:1]=10, indicating general shared space within a non-hypervisor logical partition, and applications space 608 is further characterized by an address space setting of EA[0:1]=00, indicating that the space is application specific within a non-hypervisor logical partition. In the example, application-shared address space 606 is a special, additional shared application space, available for application sharing, characterized by an address space setting of EA[0:1]=01. One of ordinary skill in the art will appreciate that while each of the spaces within address space 654 is identified by a particular setting of EA[0:1], in other embodiments, the same types of address spaces may be identified by other settings of EA bits or other register bits. In additional or alternate embodiments, additional or alternate bits may be set and encoded to represent each of the types of address spaces.

In one example, each of the spaces within address space may be further characterized by the problem state bit setting that may be associated with each address space. In one example, hypervisor space 602 an OS space 604 may represent spaces that are accessed when the problem state setting of a processor is set to operate in a supervisor mode (MSR[PR]=0) and application-shared space 606 and applications space 608 may represent spaces that are accessed when the problem state setting of a processor is set to operate in a problem state mode (MSR[PR]=1). Thus, in one example, hypervisor space 602 may represent a most privileged address space accessible when MSR[HV:PR]=10, where EA[0:1]=11 effectively represents a most privileged address space, OS space 604 may represent a second level of privileged address space accessible when MSR[HV:PR]=10 or 00, where EA[0:1]=10 effectively represents a second level of privileged address space, and application-shared space 606 and applications space 608 may represent a third level of privileged address space accessible when MSR[HV:PR]=10, 00, 01, or 11, where EA[0:1]=01 and 00 effectively represents a third level of privileged address space. In the example, FIG. 6 illustrates one example of bits specified to encode each level of privilege within an address space. One of ordinary skill in the art will appreciate that additional or alternate encoding methods may be implemented to identify the privilege levels of address spaces and that address spaces may be encoded through with privilege level information within additional or alternate EA bits or other settings within the processor. One of ordinary skill in the art will appreciate that additional or alternate privilege layers may be specified within an address space and that the additional or alternate privileges layers may be encoded into the address space through EA bit settings and other settings within the processor.

In the example, a clamp register 616 may logically represent bits of other registers within a processor or may represent specific registers set for clamp register 616. In one example, clamp register 616 may include a clamp register A 617, a clamp register B 618, and a clamp register C 619. In the example, both clamp register A 617 and clamp register B 618 are set to "0" and clamp register C 619 is set to "1", each of which represents a clamped value. In other examples, clamp register A 617 and clamp register B 618 may be implemented as a single register, rather than separate registers. In other examples, clamp register A 617 and clamp register B 618 may be set to values other than "0" and clamp register C 619 may be set to a value other than "1".

In the example, first context selection controller logic 610 may include a switch or other selection controller that includes an value read from the EA[0:1] bits of EA[0:N] address register as the control input for selecting between an input of clamp register A 617, set to "0", the clamped value, and L, the value loaded into the LPID register for the current context. The output of first context selection controller logic 610 sets the value within LPID 114 of VA 112. In the example, if the value read from the EA[0:1] is "11", then first context selection controller logic 610 outputs a "0", a clamped value representing the most privileged address space. In the example, if the value read from the EA[0:1] is not "11", then first context selection controller logic 610 outputs "L", the value read from the LPID register.

In the example, second context selection controller logic 612 may include a switch or other selection controller that includes a value read from the EA[0:1] bits of the EA[0:N] address register as the control input for selecting between an first input of clamp register B 618, set to "0", the clamped value for processes accessing hypervisor space 602 or OS space 604, a second input of clamp register C 619, set to "1", the clamped value for processes accessing application-shared address space 606 and a third input "P", the value loaded into the PID register for the current context. The output of second context selection controller logic 612 sets the value within PID 116 of VA 112. In the example, if the value read from EA[0:1] is "11" or "10", then second context selection controller logic 612 outputs a "0", a clamped value for processes accessing hypervisor space 602 or OS space 604. In the example, if the value read from EA[0:1] is "01", then second context selection controller logic 612 outputs a "1", a clamped value for processes accessing application-shared address space 606 In the example, if the value read from EA[0:1] is "00", then second context selection controller logic 612 outputs a "P", the value read from the PID register.

In the example, address space 654 illustrates, for the logic applied in first context selection controller logic 610 and second context selection controller logic 612, the LPID and PID settings applied for each type of address space, reflecting the EA[0:1] characteristics of each address space. For example, for address requests received for a context operating with EA[0:1]=11, as illustrated within hypervisor space 602, then the LPID and PID are both clamped to "0" in a VA for the address request. In the example, if EA[0:1]=01, as illustrated within application-shared address space 606, then the LPID is set to the LPID register value L and the PID is set to a clamped value of "1" for the address request. In the example, if EA[0:1]=10, as illustrated within OS space 604, then the LPID is set to the LPID register value L and the PID is clamped to "0" in a VA for the address request, and, if EA[0:1]=00, as illustrated within applications space 608, then the LPID is set to the LPID register value L and the PID is set to the PID register value P for the address request. In additional or alternate embodiments, first context selection controller logic 610 and second context selection controller logic 612 may handle additional or alternate EA encoding settings and may receive additional or alternate data inputs indicative of privilege and sharing settings for an address space. In additional or alternate embodiments, first context selection controller logic 610 may be set to clamp LPID to additional clamp values for one or more EA encoding settings, such as a clamp value of "1" for an address space with a second level of privilege, or to set LPID to other values indicative of privilege levels of address spaces. In additional or alternate embodiments, second context selection controller logic 612 may be set to clamp PID to additional clamp values for one or more EA encoding settings or to set PID to other values indicative of sharing settings of address spaces.

In the example illustrated, regardless of the MSR[HV] setting, if an address for a memory request is directed to the address space within OS space 604, application-shared address space 606, or applications address space 608, where address translations to non-hypervisor partition address space are performed by the TLB controller, then TLB entries to non-hypervisor partition address space may be shared across contexts with different privilege mode settings. In the example, effectively, if LPID 114 is set to a clamped value of "0", the clamped value of "0" is effectively the logical partition identifier for the hypervisor partition of address space identified by hypervisor space 602. In the example, if PID 116 is set to a clamped valued of "0", the clamped value of "0" is effectively the identifier for all accesses to hypervisor space 602 and OS space 604. In the example, effectively, if PID 116 is set to a clamped value of "1", the clamped value of "1" is effectively the identifier for all accesses to application-shared address space 606.

In the example, VA 112 is compared with each entry of TLB 142, such as an entry 614 by matching logic 624. In one example, matching logic 624 includes a comparator gate 626, such as an AND gate, for outputting a value indicating whether LPID 114 matches TLB PID 146 of entry 614, a gate 628 for outputting a value indicating whether PID 116 matches TLB PID 148 of entry 614, and a gate 630 for outputting a value indicating whether EA 118 matches TLB EA 150. As illustrated at reference numeral 622, if all the outputs from gate 626, gate 628, and gate 630 indicate the compared fields of VA 112 match the compared fields of entry 614, then a TLB hit signal is output and real page number 152 from the entry triggering the TLB hit is read as the RA translation for the VA. In the example, if none of the entries in TLB 142 yield a TLB hit as illustrated at reference numeral 622, then as illustrated at reference numeral 620, a TLB miss is triggered. If a TLB miss is triggered, mechanisms for tracing through page tables and other addressing tables to trace an RA for a VA are triggered, such as by triggering a page fault exception that is handled by a guest OS or hypervisor. In one example, once an RA is traced for a VA, a TLB entry is added to TLB 142 with the VA and the real page number for the RA identified for the VA. While in the example illustrated, EA 118 is illustrated as including bits [2:N] of the total bits EA [0:N] and TLB EA 150 may include bits [2:N], in additional or alternate examples, EA 118 may include bits [0:N], TLB EA 150 may include bits [0:N], and VA 112 and TLB entry 614 may each include additional bits that are only selectively compared against one another, to enable a system in which clamping can be enabled or disabled. For example, when clamping is enabled, the additional bits may not be compared against one another when VA 112 is compared against the entries within TLB 142.

In the example illustrated, TLB 142 may include TLB entries for contexts of different privilege levels, such that for context shifts between different privilege levels, the TLB entries for contexts of different privilege levels may all remain within TLB 142, where the current context may only receive a TLB hit on TLB entries entered for a previous context of the same privilege level to the most privileged address space, but the current context may receive a TLB hit on TLB entries entered for a previous context of any privilege level to the other address spaces. For example, TLB 142 may include an entry for an address translated from hypervisor space 602, which effectively requires the context also operate with a highest privilege level setting of MSR[HV]=1, and may include an entry for an address translated from OS space 604, added for a context where MSR[HV]=0 or 1. In the example, all the entries within TLB 142 with TLB_LPID marked to "0" represent TLB entries for translating address space requests by contexts with MSR[HV]=1 and EA[0:1]= 11. In the example, all the entries within TLB 142 with TLB_LPID marked to a value other than "0" represent TLB entries for an translating address space request for a current context not addressed to hypervisor space 602, where the current context may only receive a TLB hit to TLB entries entered for a previous context from a same LPAR, with a same value L loaded into the LPID register.

In one example, one or more additional components or functions may be implemented to filter and restrict access to entries within the TLB or to restrict use of entries access from the TLB based on MSR[HV] and MSR[PR] setting requirements for each address space. In one example, each TLB entry may include a separate privilege flag that indicates the required setting of one or more of HV or PR for a current context to access a particular entry. In another example, hypervisor 166 or other logic within processor core 102 may restrict access to hypervisor space 602 or to entries within TLB 142 for hypervisor space 602 to only those requests with MSR[HV:PR]=10 and restrict access to OS space 604 or to entries within TLB 142 for OS space 604 to only those requests with MSR[HV:PR]=10 or 00. One of ordinary skill in the art will appreciate that additional or alternate software and hardware functions may be implemented to provide protected access to specific address spaces that are designated as requiring certain privilege levels to access the specific address space.

In the example illustrated, TLB 142 may also include TLB entries that are shareable by multiple processes including a same, single entry for any shared address space accessible across multiple processes. For example, TLB 142 may manage a single entry for access by multiple contexts accessing a same shared address space, independent of the PID register value of the process originally triggering the TLB entry. In the example, all the entries within TLB 142 with TLB_LPID 146 marked to a value other than "0" and TLB PID marked to "0" represent shared TLB entries for translating all process requests to OS space 604 for the designated LPID. In the example, all entries within TLB 142 with TLB PID 146 marked to "1", may represent shared TLB entries for translating all process requests to application-shared address space 606 In the example, all entries within TLB 142 with TLB_LPID 146 marked to a value other than "0" and TLB_PID marked to a value other than "0" or "1" represent TLB entries for translating an address space request for a current context that is requesting access to an address space that is application specific.

As previously described with reference to matching logic 324 in FIG. 3, in the example, by storing TLB entries within TLB 142 that may include clamped values in TLB PID 148 and by also clamping PID 116 in the VA for a request to shared access space, a single, direct comparison, using a simple logic gate, may be made between PID 116 and TLB PID 148 to determine a TLB hit to an entry within matching logic 624. In addition, as previously described with reference to matching logic 324 in FIG. 3, in the example, by storing TLB entries within TLB 142 that may include clamped values in TLB LPID 146 and by also clamping LPID 114 in the VA for a context operating in the highest privilege mode, a single, direct comparison, using a simple logic gate, may be made between LPID 114 and TLB LPID 146 to determine a TLB hit to an entry within matching logic 624.

FIG. 7 illustrates one example of a high level logic flowchart of a process and program for managing translation of a same address across multiple contexts using a same entry in a TLB, where address translations to non-hypervisor partition address space are performed by the TLB controller independent of a highest privilege mode setting.

In the example, the process and program starts at block 700 and thereafter proceed to block 702. Block 702 illustrates a loading an address EA[0:N].

Next, block 704 illustrates selecting the LPID and PID values for a current context by the process passing to block 706. Block 706 illustrates a determination whether the address request for a context is directed to a most privileged address space, for example if EA[0:1]=11 for a hypervisor space. At block 706, if the address request for the context is directed to a most privileged address space, then the process passes to block 708. Block 708 illustrates clamping the LPID to the clamp value (0), and the process passes to block 712. At block 706, if the address request or the context is not directed to a most privileged address space, then the process passes to block 710. Block 710 illustrates setting the LPID to the LPID register value L, and the process passes to block 712.

Block 712 illustrates a determination whether the address request is directed to a general shared address space, for example if EA[0:1]=10. At block 712, if the address request is directed to a general shared address space, then the process passes to block 714. Block 714 illustrates clamping the PID to the clamp value (0), and the process proceeds to block 722. At block 712, if the address request is not directed to a shared address space, then the process passes to block 716.

Block 716 illustrates a determination whether the address request is directed to application-shared space, for example if EA[0:1]=01. At block 716, if the address request is directed to an application shared space, then the process passes to block 718. Block 718 illustrates clamping the PID to "1", and the process proceeds to block 722. At block 716, if the address request is not directed to application-shared space, then the process passes to block 720. Block 720 illustrates setting the PID to the PID register value P, and the process passes to block 722.

Block 722 illustrates performing a TLB lookup for the VA set to the LPID, the PID, and all of or a portion of the EA, depending on the portion of the EA that is comparable to the TLB EA, such as EA[2:N]. Next, block 724 illustrates a determination whether there is a TLB hit. At block 724, if there is a TLB hit, then the process passes to block 726. Block 726 illustrates accessing the matching entry in the TLB, and the process ends. At block 728, if there is not a TLB hit, then the process passes to block 728. Block 728 illustrates triggering a controller, which may include a software or a hardware controller, to determine the real address (RA) associated with the VA, such as by determining the real page number associated with the EA. Next, block 730 illustrates adding a new TLB entry to with the VA and RA to the TLB, where the VA is set to the LPID and PID values calculated for the current context.

FIG. 8 illustrates a block diagram of one example of a TLB controller managing translation of a same address across multiple contexts using a same entry in a TLB and managing a TLB with entries available for contexts with different privilege levels, where address translations to non-hypervisor partition address space are performed by the TLB controller independent of a highest privilege mode setting.

In the example, at each of multiple times, a current context 802 loaded into a processor is described, including the LPID and PID values set for a VA by a TLB controller, a TLB controller action 804 is illustrated, and a TLB status 806 is illustrated, showing the current TLB entries within a TLB. While in the example illustrated, the current status illustrates TLB EA as including bits [2:N], and the VA at each of the times is illustrated with EA[2:N], in additional or alternate examples, each TLB EA may include bits [0:N], and each VA at each time may include bits [0:N], where the additional bits may be selectively compared against one another.

In the examples illustrated, the setting for the TLB translation control parameter MSR[IR:DR] is MSR[IR]=1 or MSR[DR]=1. In additional or alternate embodiments, MSR[IR:DR] may also switch to a setting of "00" for one or more requests and the hypervisor may manage translations without TLB lookups, for example, as illustrated at time T=3 in FIG. 5.

In one example, at time T=1, TLB status 806 illustrates a TLB table with an entry 808, identified by an ID of "1", with a TLB LPID of "1", a TLB PID of "3", a TLB EA of "CC . . . " and a TLB RA of "RPN1". In the example, TLB entry 808 is directed to an address within applications space 608, specified within a space allocated for a LPAR with an L of "1" and for a process with a P of "3".

In one example, at a time T=2, current context 810 illustrates characteristics of a context and the LPID and PID values set in the VA for the context. In the example of current context 810, the address request EA[0:N]="11AA . . . ", MSR[HV]=1, LPIDR=L, and PIDR=P. In addition, in the example of current context 810, based on the setting of EA[0:1]=11, both the LPID and the PID are clamped to "0". In the example, regardless of the values of L and P, the TLB controller compares a VA of "0|0|AA . . . " into the TLB entry and detects a TLB miss. As illustrated at action 814, in response to the TLB miss, an entry is added to the TLB for the VA. In the example, entry 816 is added to the TLB, with and ID of "2", a TLB LPID of "0", a TLB PID of "0", a TLB EA of "AA . . . " and a TLB RA of "RPN2".

In one example, at a time T=3, current context 816 illustrates characteristics of a context and the LPID and PID values set in the VA for the context. In the example of current context 816, the address request EA[0:N]="10BB . . . ", MSR[HV]=1, LPIDR=2, and PIDR=8. In addition, in the example of current context 816, based on the setting of EA[0:1]=10, LPID is set to the value L in LPIDR of "2" and PID is clamped to "0". In the example, the TLB controller compares a VA of "2|0|BB . . . " into the TLB entry and detects a TLB miss. As illustrated at action 818, in response to the TLB miss, an entry is added to the TLB for the VA. In the example, entry 820 is added to the TLB, with and ID of "3", a TLB LPID of "2", a TLB PID of "0", a TLB EA of "BB . . . " and a TLB RA of "RPN3".

In one example, at a time T=4, current context 822 illustrates characteristics of a context and the LPID and PID values set in the VA for the context. In the example of current context 822, the address request EA[0:N]="10BB . . . ", MSR[HV]=0, LPIDR=2, and PIDR=7. In addition, in the example of current context 520, based on the setting of EA[0:1]=10, the LPID is set to the value of LPIDR of "2" and the PID is clamped to "0". In the example, the TLB controller compares a VA of "2|0|BB . . . " into the TLB entry and detects a TLB hit into the TLB entry with an ID=3, which is entry 820. In the example, although the MSR[HV] and PIDR values for context 816, which triggered entry 820, are different from the MSR[HV] and PIDR values for context 822, a same entry 820, which is directed to shared OS space 604, may be shared across contexts with different privilege levels and different processes, without adding a separate TLB entry for each privilege level or each process, and independent of the MSR [HV] or PIDR value of the context that triggered entry 820.

In one example, at a time T=5, current context 826 illustrates characteristics of a context and the LPID and PID values set in the VA for the context. In the example of current context 826, the address request EA[0:N]="00CC . . . ", MSR[HV]=0, LPIDR=1, and PIDR=3. In addition, in the example of current context 826, based on the setting of EA[0:1]=00, the LPID is set to the value of LPIDR of "1" and the PID is set to the PIDR value of "3". In the example, the TLB controller compares a VA of "1|3|CC . . . " into the TLB entry and detects a TLB hit into the TLB entry with an ID=1, which is entry 808. In the example, the TLB may include entry 808 directed to addressing within applications space 608, which is not shared address space, and entry 808 only triggers a TLB hit for a current context when the current context has the same context characteristics for LPIDR, PIDR, and EA illustrated in current context 826.

In one example, at a time T=6, current context 830 illustrates characteristics of a context and the LPID and PID values set in the VA for the context. In the example of current context 830, the address request EA[0:N]="01BB . . . ", MSR[HV]=0, LPIDR=8, and PIDR=3. In addition, in the example of current context 830, based on the setting of EA[0:1]=01, directed to application-shared address space 606, the LPID is set to the value of LPIDR of "8" and the PID is clamped to "1". In the example, the TLB controller compares a VA of "8|1|BB . . . " into the TLB entry and detects a TLB miss. As illustrated at action 832, in response to the TLB miss, an entry is added to the TLB for the VA. In the example, entry 834 is added to the TLB, with and ID of "4", a TLB LPID of "8", a TLB PID of "1", a TLB EA of "BB . . . " and a TLB RA of "RPN4".

In one example, at a time T=7, current context 836 illustrates characteristics of a context and the LPID and PID values set in the VA for the context. In the example of current context 836, the address request EA[0:N]="11AA . . . ", MSR[HV]=1, LPIDR=L, and PIDR=P. In addition, in the example of current context 836, based on the setting of EA[0:1]=11, regardless of the values of L and P, the LPID and PID are both clamped to "0". In the example, the TLB controller compares a VA of "0|0|AA . . . " into the TLB entry and detects a TLB hit into the TLB entry with an ID=2, which is entry 816. In the example, the TLB may include entry 816 directed to addressing within hypervisor space 602, which is only accessible when MSR[HV]=1, and entry 816 may trigger a TLB hit for any current context with context characteristics of EA[0:N]="11AA . . . " and MSR[HV]=1, regardless of the values loaded into the LPIDR and PIDR for the context. Effectively, by clamping the LPID to "0" for a context with an address request directed to the most privileged address space of EA[0:1]=11, anytime the MSR[HV]=1 and the EA is directed to hypervisor space 602, a same entry 816 may be accessed only when the context switches to the highest privileged mode setting.

In one example, at a time T=8, current context 840 illustrates characteristics of a context and the LPID and PID values set in the VA for the context. In the example of current context 840, the address request EA[0:N]="01BB . . . ", MSR[HV]=1, LPIDR=8, and PIDR=4. In addition, in the example of current context 840, based on the setting of EA[0:1]=01, the LPID is set to the LPIDR value of "8" and the PID is clamped to "1". In the example, the TLB controller compares a VA of "8|1|BB . . . " into the TLB entry and detects a TLB hit into the TLB entry with an ID=4, which is entry 834.

In the example, the TLB may include entry 834 directed to addressing within application-shared space 606, which may trigger a TLB hit for any current context with context characteristics of EA[0:N]="01BB . . . ", regardless of the PIDR for the context. Effectively, by clamping the PID to "1" for a context with an address request directed to the application-shared space of EA[0:1]=01, anytime the EA is directed to application-shared space 606, a same entry 834 may be accessed only when the same LPID is identified. In the example, although the MSR[HV] and PIDR values for context 830, which triggered entry 834, are different from the MSR[HV] and PIDR values for context 840, a same entry 834, which is directed to application-shared space 606, may be shared across contexts with different privilege levels and different processes, without adding a separate TLB entry for each privilege level or each process, and independent of the MSR[HV] or PIDR value of the context that triggered entry 834.

In the example, TLB status 806 shows that a TLB may concurrently maintain TLB entries directed to multiple privilege levels, TLB entries for shared address space shared between multiple contexts directed to a same logical partition and independent of privilege level, and TLB entries for application space shared between multiple contexts directed to a same logical partition and process and independent of privilege level. For example, entry 816 effectively will only trigger a TLB match when compared to contexts authorized to address to EA[0:1]=11, which are set to the highest privilege level by MSR[HV]=1. In contrast, entry 808 and entry 820, will trigger a TLB match regardless of the privilege level mode setting for other EA settings. On context switches between contexts with MSR[HV]=1 or 0 and on context switches between contexts with address request directed to EA[0:1]=11, 10, 01, or 00, entry 808, entry 816, entry 820, and entry 834 may all remain in the TLB.

Figure 9:
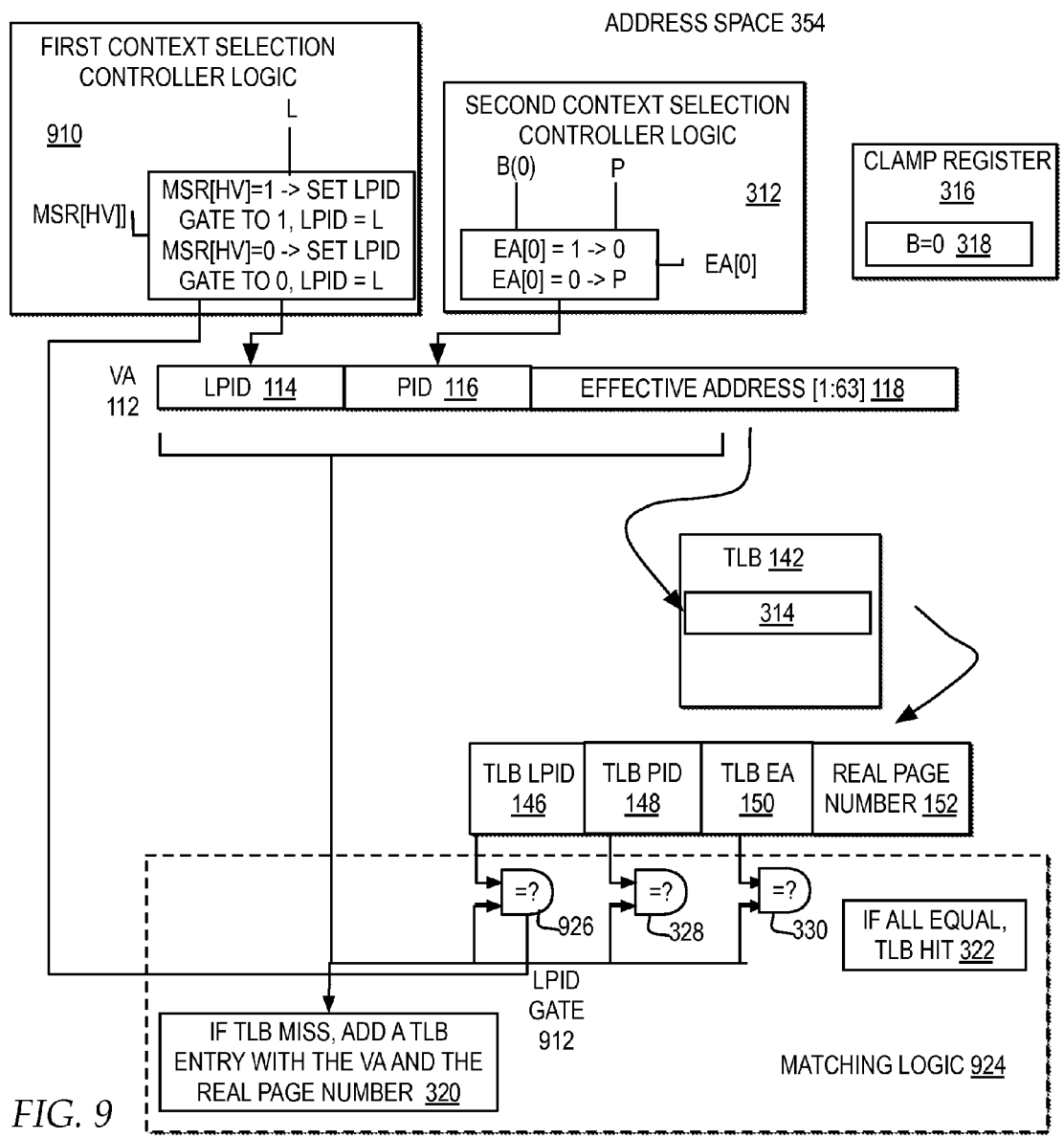
FIG. 9 is a block diagram illustrating one example of components of a TLB controller for managing translations using a TLB in a processor, where for contexts set to a highest privilege mode the LPID comparison value is automatically set.

FIG. 9 illustrates a block diagram of one example of a TLB controller for managing translations using a TLB in a processor, where for contexts set to a highest privilege mode the LPID comparison value is automatically set.

The example in FIG. 9 illustrates an example with many elements described in FIG. 3, but implements first context selection controller logic 910 and an LPID gate 926. In the example illustrated in FIG. 9, clamping based on a highest privilege mode setting (MSR[HV]) is performed by suppressing the matching of an LPID when MSR[HV]=1, along with clamping based on the shared address space setting (EA[0]). In the example, for the current context, an address EA[0N] requires translation into a real address (RA).

In the example, the address space is characterized as illustrated in address space 354, however, in other examples, the address space may be characterized as illustrated in address space 654 or other address space characterizations. In the example, first context selection controller logic 910 may include a switch or other selection controllers that includes a value read from the MSR[HV] register as the control input for selecting whether to set a logic gate output to high or low, and that controls loading LPID 114 with the value L set in the LPID register. In the example, if the value read from the MSR[HV] register is "1", then first context selection controller logic 910 sets an LPID gate output to a matching value of "1" or sets an LPID gate flag. In the example, if the value read from the MSR[HV] register is "0", then first context selection controller logic 310 sets an LPID gate output to a value of "0" and outputs "L", the value read from the LPID register, to set the value within LPID 114 of VA 112 to L.

In the example illustrated, matching logic 924 may implement a comparator gate 926, where gate 926 includes an input LPID gate 912, that when set to "1", automatically sets the output of gate 926 to indicate a match between TLB LPID 146 and LPID 114. In one example, when MSR[HV]=1, first context selection controller logic 910 sets an LPID gate output to a matching value of "1", such that when VA 112 is compared with entry 314, the output from gate 926 indicates a match, regardless of the values within TLB LPID 146 or LPID 114. In another example, when MSR[HV]=1, first context selection controller logic 910 sets an LPID gate output to a value of "0", where when LPID gate 912 is set to "0", the gate requires a match between TLB LPID 146 and LPID 114 to indicate a match. In the example, in the event of a TLB miss, the TLB entry loaded into TLB 142 for the context may include TLB LPID 146 set to LPID 114, where LPID 114 is loaded with "L". In the example, effectively, by setting gate 926 to indicate a match for contexts where MSR[HV]=1, comparison of LPID 114 and TLB LPID 146 is suppressed.

In another example, to suppress comparisons of LPID 114 and TLB LPID 146 when MSR[HV]=1, the LPID gate setting by first context selection controller logic 910 may set a value in a register that is compared against the outputs of gate 926, gate 328, and gate 330 to indicate whether the outputs of the gates set a TLB hit. In additional or alternate embodiments, where comparison suppression of a particular field within a VA or TLB entry is enabled, first context selection controller logic 910 and second context selection controller logic 312 may be adapted to set control bits of existing field suppression logic for a TLB controller to manage translation of a same address across multiple contexts using a same entry in a TLB and manage a TLB with entries maintained for contexts with different privilege levels.

Figure 10:
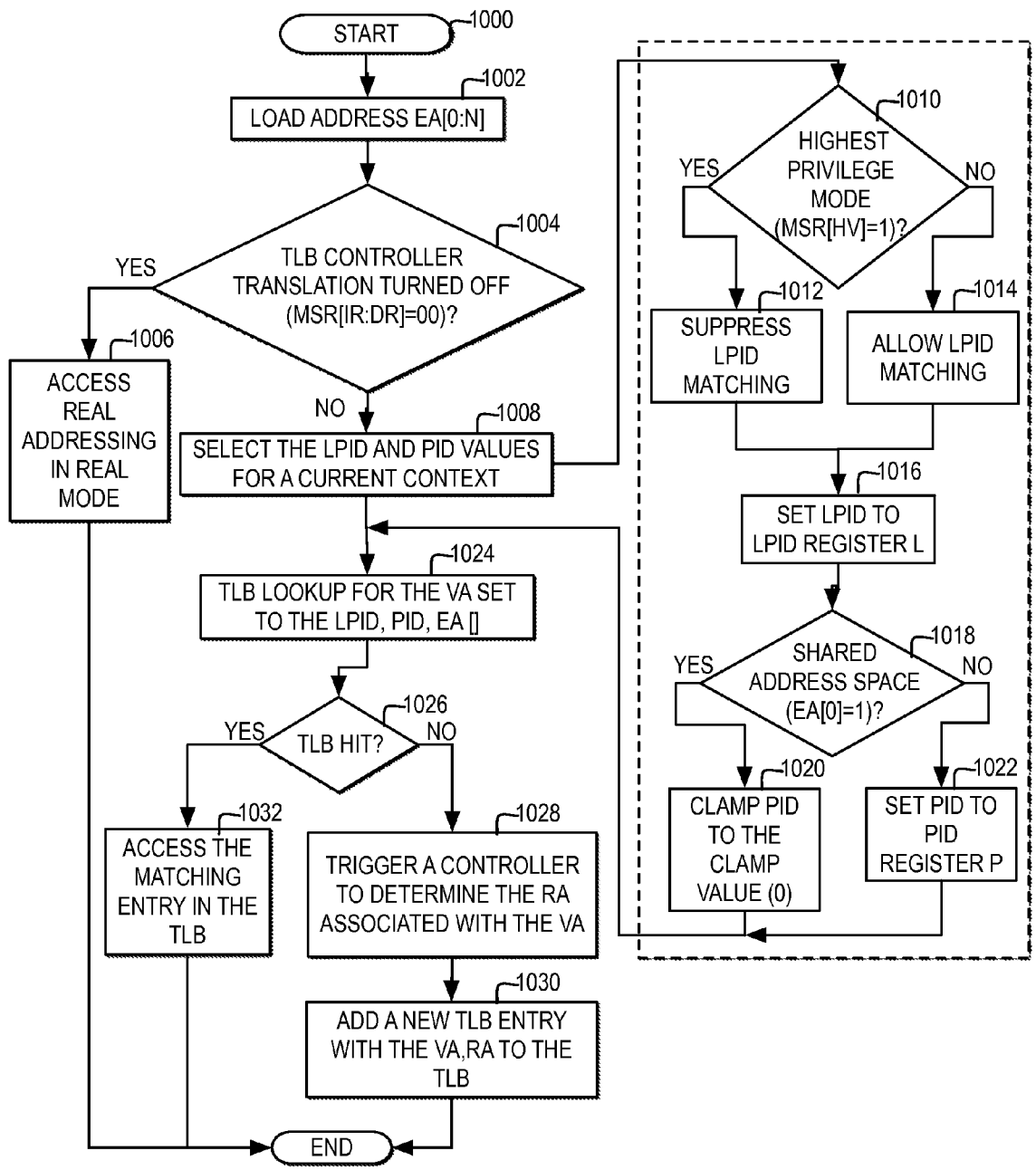
FIG. 10 is a high level logic flowchart illustrating one example of a process and program for managing translation of a same address across multiple contexts using a same entry in a TLB, where for contexts set to a highest privilege mode an LPID comparison is suppressed.

FIG. 10 illustrates one example of a high level logic flowchart of a process and program for managing translation of a same address across multiple contexts using a same entry in a TLB, where for contexts set to a highest privilege mode an LPID comparison is suppressed.

In the example, the process and program starts at block 1000 and thereafter proceed to block 1002. Block 1002 illustrates loading an address EA[0:N]. In the example, the address space described by address EA[0:N] specifies a first bit EA[0] for designating whether the address space is considered within the kernel space of a logical partition. Next, block 1004 illustrates a determination whether TLB controller translation is turned off, such as by determining whether MSR[IR]=0 or MSR[DR]=0. At block 1004, if the TLB controller translation is turned off, then the process passes to block 1006. Block 1006 illustrates the hypervisor accessing real addressing for the request in a real mode, and the process ends. At block 1004, if TLB controller translation is not turned off, then the process passes to block 1008. In another example, the determination performed by block 1004 may be performed by a different process, such that the process illustrated in FIG. 10, without block 1004 and block 1006, is only triggered if block 1004 has been evaluated by another process and the condition in block 1004 is not true. For example, a hypervisor may perform the function illustrated by block 1004 as a software logic function, whereas a processor may perform other functions of FIG. 10 as hardware logic functions.

Block 1008 illustrates selecting the LPID and PID values for a current context by the process passing to block 1010. Block 1010 illustrates a determination whether a context is set to a highest privilege mode, for example if MSR[HV]=1. At block 1010, if the context is set to a highest privilege mode, then the process passes to block 1012. Block 1012 illustrates suppressing LPID matching, such as by setting an LPID gate value to "1" to automatically set the gate that compares an LPID and a TLB LPID to "0", or in software, by removing the LPID and TLB LPID values from the comparison equation for a TLB hit, and the process passes to block 1016. At block 1010, if the context is not set to a highest privilege mode, for example if MSR[HV]=0, then the process passes to block 1014. Block 1014 illustrates allowing LPID matching, and the process passes to block 1016. Block 1016 illustrates setting the LPID to the LPID register value L, and the process passes to block 1018.

Block 1018 illustrates a determination whether the address request is directed to a shared address space, for example if EA[0]=1. At block 1018, if the address request is directed to a shared address space, then the process passes to block 1020. Block 1020 illustrates clamping the PID to the clamp value (0), and the process proceeds to block 1024. At block 1018, if the address request is not directed to a shared address space, then the process passes to block 1022. Block 1022 illustrates setting the PID to the PID register value P, and the process passes to block 1024.

Block 1024 illustrates performing a TLB lookup for the VA set to the LPID, the PID, and all of or a portion of the EA, depending on the portion of the EA that is comparable to the TLB EA, such as EA[1:N]. Next, block 1026 illustrates a determination whether there is a TLB hit. At block 1026, if there is a TLB hit, then the process passes to block 1032. Block 1032 illustrates accessing the matching entry in the TLB, and the process ends. At block 1026, if there is not a TLB hit, then the process passes to block 1028. Block 1028 illustrates triggering a controller, which may include a software or a hardware controller, to determine the real address (RA) associated with the VA, such as by determining the real page number associated with the EA. Next, block 1030 illustrates adding a new TLB entry to with the VA and RA to the TLB, where the VA is set to the LPID and PID values calculated for the current context.

Figure 11:
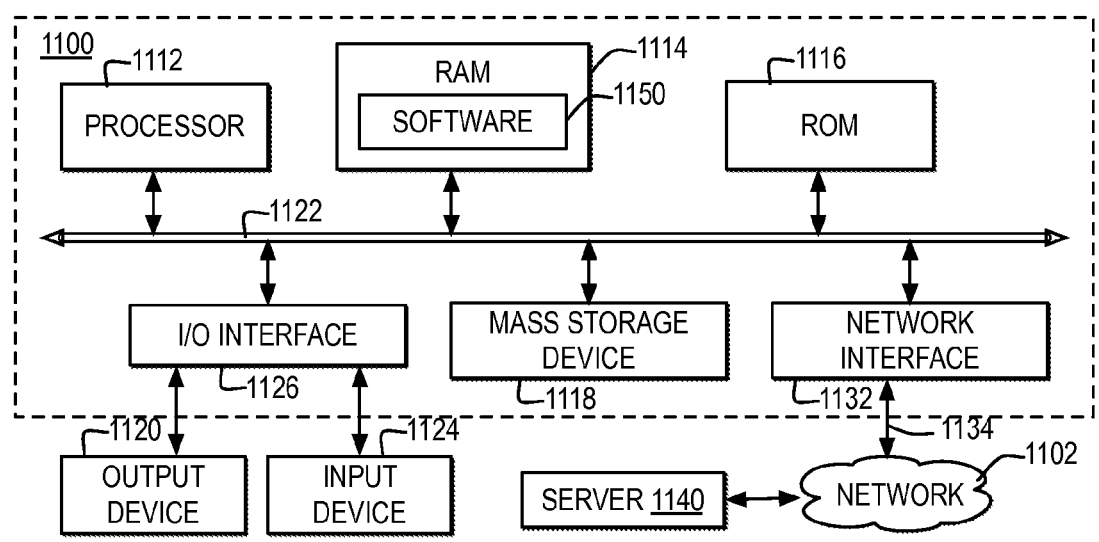
FIG. 11 is a block diagram illustrating one example of a computer system in which one embodiment of the invention may be implemented.

FIG. 11 illustrates a block diagram of one example of a computer system in which one embodiment of the invention may be implemented. The present invention may be performed in a variety of systems and combinations of systems, made up of functional components, such as the functional components described with reference to a computer system 1100 and may be communicatively connected to a network, such as network 1102.

Computer system 1100 includes a bus 1122 or other communication device for communicating information within computer system 1100, and at least one hardware processing device, such as processor 1112, coupled to bus 1122 for processing information. Bus 1122 preferably includes low-latency and higher latency paths that are connected by bridges and adapters and controlled within computer system 1100 by multiple bus controllers. When implemented as a server or node, computer system 1100 may include multiple processors designed to improve network servicing power. Where multiple processors share bus 1122, additional controllers (not depicted) for managing bus access and locks may be implemented.

Processor 1112 may be at least one general-purpose processor such as IBM® PowerPC® processor that, during normal operation, processes data under the control of software 1150, which may include at least one of application software, an operating system, middleware, and other code and computer executable programs accessible from a dynamic storage device such as random access memory (RAM) 1114, a static storage device such as Read Only Memory (ROM) 1116, a data storage device, such as mass storage device 1118, or other data storage medium. Software 1150 may include, but is not limited to, code, applications, protocols, interfaces, and processes for controlling one or more systems within a network including, but not limited to, an adapter, a switch, a server, a cluster system, and a grid environment.

Computer system 1100 may communicate with a remote computer, such as server 1140, or a remote client. In one example, server 1140 may be connected to computer system 1100 through any type of network, such as network 1102, through a communication interface, such as network interface 1132, or over a network link that may be connected, for example, to network 1102.

In the example, multiple systems within a network environment may be communicatively connected via network 1102, which is the medium used to provide communications links between various devices and computer systems communicatively connected. Network 1102 may include permanent connections such as wire or fiber optics cables and temporary connections made through telephone connections and wireless transmission connections, for example, and may include routers, switches, gateways and other hardware to enable a communication channel between the systems connected via network 1102. Network 1102 may represent one or more of packet-switching based networks, telephony based networks, broadcast television networks, local area and wire area networks, public networks, and restricted networks.

Network 1102 and the systems communicatively connected to computer 1100 via network 1102 may implement one or more layers of one or more types of network protocol stacks which may include one or more of a physical layer, a link layer, a network layer, a transport layer, a presentation layer, and an application layer. For example, network 1102 may implement one or more of the Transmission Control Protocol/Internet Protocol (TCP/IP) protocol stack or an Open Systems Interconnection (OSI) protocol stack. In addition, for example, network 1102 may represent the worldwide collection of networks and gateways that use the TCP/IP suite of protocols to communicate with one another. Network 1102 may implement a secure HTTP protocol layer or other security protocol for securing communications between systems.

In the example, network interface 1132 includes an adapter 1134 for connecting computer system 1100 to network 1102 through a link and for communicatively connecting computer system 1100 to server 1140 or other computing systems via network 1102. Although not depicted, network interface 1132 may include additional software, such as device drivers, additional hardware and other controllers that enable communication. When implemented as a server, computer system 1100 may include multiple communication interfaces accessible via multiple peripheral component interconnect (PCI) bus bridges connected to an input/output controller, for example. In this manner, computer system 1100 allows connections to multiple clients via multiple separate ports and each port may also support multiple connections to multiple clients.

In one embodiment, the operations performed by processor 1112 may control the operations of flowchart of FIGS. 4, 7, and 10 and other operations described herein. Operations performed by processor 1112 may be requested by software 1150 or other code or the steps of one embodiment of the invention might be performed by specific hardware components that contain hardwired logic for performing the steps, or by any combination of programmed computer components and custom hardware components. In one embodiment, one or more components of computer system 1100, or other components, which may be integrated into one or more components of computer system 1100, may contain hardwired logic for performing the operations of flowcharts FIGS. 4, 7, and 10.

In addition, computer system 1100 may include multiple peripheral components that facilitate input and output. These peripheral components are connected to multiple controllers, adapters, and expansion slots, such as input/output (I/O) interface 1126, coupled to one of the multiple levels of bus 1122. For example, input device 1124 may include, for example, a microphone, a video capture device, an image scanning system, a keyboard, a mouse, or other input peripheral device, communicatively enabled on bus 1122 via I/O interface 1126 controlling inputs. In addition, for example, output device 1120 communicatively enabled on bus 1122 via I/O interface 1126 for controlling outputs may include, for example, one or more graphical display devices, audio speakers, and tactile detectable output interfaces, but may also include other output interfaces. In alternate embodiments of the present invention, additional or alternate input and output peripheral components may be added.

With respect to FIG. 11, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Those of ordinary skill in the art will appreciate that the hardware depicted in FIG. 11 may vary. Furthermore, those of ordinary skill in the art will appreciate that the depicted example is not meant to imply architectural limitations with respect to the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification specify the presence of stated features, integers, steps, operations, elements, and/or components, but not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the one or more embodiments of the invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While the invention has been particularly shown and described with reference to one or more embodiments, it will be understood by those skilled in the art that various changes in form and detail may be made therein without departing from the spirit and scope of the invention.

What is claimed is:

1. A method for managing translations, comprising:
   for a current context in control of a processor requesting access to a particular address, specifying a virtual address with a logical partition identifier value indicating a privilege setting of the current context, a process identifier value indicating whether the address is within shared address space, and an effective address comprising at least a portion of the particular address; and
   in response to the virtual address not matching at least one entry within a translation lookaside buffer comprising at least one entry stored for at least one previous translation of at least one previous address, translating the virtual address into a real page number using at least one page table and adding a new entry to the translation lookaside buffer with the virtual address and the real page number, wherein each at least one entry within the translation lookaside buffer identifies a separate privilege setting from among a plurality of privilege settings and a separate indicator of whether the address is within the shared address space.

2. The method according to claim 1, further comprising:
   comparing the virtual address with each at least one entry within the translation lookaside buffer comprising the at least one entry stored for at least one previous translation of at least one previous address, wherein each entry comprises a translation logical partition identifier value indicating a privilege setting of the at least one previous context, a translation process identifier value indicating whether the address within the at least one previous context is within shared address space, and a translation effective address comprising at least a portion of at least one previous address for the at least one previous context.

3. The method according to claim 1, wherein, for a current context currently in control of a processor requesting access to a particular address, specifying a virtual address with a logical partition identifier value indicating a privilege setting of the current context, a process identifier value indicating whether the address is within shared address space, and an effective address comprising at least a portion of the particular address, further comprises:
   determining whether the privilege setting of the current context is set to a selected highest privilege mode from among a plurality of privilege modes;
   responsive to the privilege setting of the current context set to the selected highest privilege mode, setting the logical partition identifier value to a clamped value, wherein the clamped value indicates that the privilege setting is the selected highest privilege mode, wherein the highest privilege mode allows the current context to access a total address space; and
   responsive to the privilege setting of the current context not set to the selected highest privilege mode, setting the logical partition identifier value to an identifier for a particular logical partition from among a plurality of logical partitions managed by a hypervisor, wherein if the privilege mode of the current context is not set to the selected highest privilege mode, the current context has limited access to only a portion of the total address space allocated by the hypervisor to the particular logical partition.

4. The method according to claim 3, wherein determining whether the privilege setting of the current context is set to a selected highest privilege mode from among a plurality of privilege modes further comprises:
   reading a machine state register setting for a hypervisor bit, wherein the machine state register setting for the hypervisor bit is set by the hypervisor when switching access to the current context, wherein the hypervisor bit is set to a first value to set the privilege setting to the selected highest privilege mode.

5. The method according to claim 1, wherein, for a current context currently in control of a processor requesting access to a particular address, specifying a virtual address with a logical partition identifier value indicating a privilege setting of the current context, a process identifier value indicating whether the address is within shared address space, and an effective address comprising at least a portion of the particular address, further comprises:
   determining whether the address is within the shared address space based on a setting of at least one bit within the effective address, wherein the setting of the at least one bit is specified for the identifying the shared address space as a portion of the total address space;
   responsive to the setting of the at least one bit set to the shared address space, setting the process identifier value to a clamped value, wherein the clamped value indicates that effective address is directed to the shared address space, wherein a plurality of processes operating within a particular logical partition share access to the shared address space; and responsive to the setting of the at least one bit not set to the shared address space, setting the process identifier value to an identifier for a particular process from among the plurality of processes operating within the particular logical partition.

6. The method according to claim 1, wherein, for a current context currently in control of a processor requesting access to a particular address, specifying a virtual address with a logical partition identifier value indicating a privilege setting of the current context, a process identifier value indicating whether the address is within shared address space, and an effective address comprising at least a portion of the particular address, further comprises:

determining whether the privilege setting of the current context is set to access a most protected address space from among a total address space, wherein the most protected address space is only accessible if the current context is also set to a privilege setting of a selected highest privilege mode from among a plurality of privilege modes;

responsive to the privilege setting of the current context set to the most protected access space, setting the logical partition identifier value to a clamped value, wherein the clamped value indicates that the privilege setting is to the most protected address space; and responsive to the privilege setting of the current context not set to the most protected access space, setting the logical partition identifier value to an identifier for a particular logical partition from among a plurality of logical partitions managed by a hypervisor, wherein the current context has limited access to only a portion of the total address space allocated by the hypervisor to the particular logical partition.

7. The method according to claim 1, wherein, for a current context currently in control of a processor requesting access to a particular address, specifying a virtual address with a logical partition identifier value indicating a privilege setting of the current context, a process identifier value indicating whether the address is within shared address space, and an effective address comprising at least a portion of the particular address, further comprises:

determining whether the address is within the shared address space based on a setting of a first bit within the effective address, wherein the setting of the first bit is specified for the identifying the shared address space as a portion of the total address space;

responsive to the setting of the first bit set to the shared address space, setting the process identifier value to a first clamped value, wherein the first clamped value indicates that effective address is directed to the shared address space, wherein a plurality of processes operating within a particular logical partition share access to the shared address space, wherein if the current context is operating in a highest privilege setting the current context may access all of the total address space;

responsive to the setting of the first bit not set to the shared address space, determining whether the address is within hypervisor application space based on a setting of a second bit within the effective address, wherein the setting of the second bit is specified for distinguishing the hypervisor application space within a hypervisor logical partition from among a plurality of logical partitions from application space allocated across a remaining selection of the plurality of logical partitions;

responsive to the setting of the second bit set to the hypervisor application space, setting the process identifier value to a second clamped value different from the first clamped value, wherein the second clamped value indicates that effective address is directed to the hypervisor application space; and responsive to the setting of the second bit not set to the hypervisor application space, setting the process identifier value to an identifier for a particular process from among the plurality of processes operating within the particular logical partition.

8. The method according to claim 1, further comprising:

determining whether the privilege setting of the current context is set to a highest privilege mode; and responsive to the privilege setting of the current context set to the highest privilege mode, suppressing the logical partition identifier value from the virtual address, such that the logical partition identifier value is not compared with a translation logical partition identifier value within each entry within the translation lookaside buffer.

* * * * *